United States Patent
Geddes et al.

(10) Patent No.: US 11,775,414 B2
(45) Date of Patent: Oct. 3, 2023

(54) AUTOMATED BUG FIXING USING DEEP LEARNING

(71) Applicant: RAM Laboratories, Inc., San Diego, CA (US)

(72) Inventors: John Darragh Geddes, San Diego, CA (US); Robert Michael McGraw, Del Mar, CA (US)

(73) Assignee: RAM Laboratories, Inc., San Diego, CA (US)

( * ) Notice: Subject to any disclaimer, the term of this patent is extended or adjusted under 35 U.S.C. 154(b) by 9 days.

(21) Appl. No.: 17/476,328

(22) Filed: Sep. 15, 2021

(65) Prior Publication Data

US 2022/0083450 A1    Mar. 17, 2022

Related U.S. Application Data

(60) Provisional application No. 63/079,785, filed on Sep. 17, 2020.

(51) Int. Cl.
*G06F 11/36* (2006.01)
*G06N 20/00* (2019.01)
*G06F 8/70* (2018.01)

(52) U.S. Cl.
CPC ............ *G06F 11/3624* (2013.01); *G06F 8/70* (2013.01); *G06F 11/3608* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2019/0138731 | A1* | 5/2019 | Tan | G06F 21/57 |
| 2019/0228319 | A1* | 7/2019 | Gupta | G06F 8/35 |
| 2020/0097389 | A1* | 3/2020 | Smith | G06F 11/3404 |
| 2020/0349052 | A1* | 11/2020 | Wehr | G06F 8/427 |
| 2021/0026605 | A1* | 1/2021 | Evangelopoulos | G06F 8/70 |
| 2021/0157577 | A1* | 5/2021 | Sobran | G06F 8/73 |
| 2021/0165647 | A1* | 6/2021 | Krishnamoorthy | G06F 8/658 |
| 2021/0182703 | A1* | 6/2021 | Velammal | G06N 5/046 |
| 2021/0240453 | A1* | 8/2021 | Badlani | G06F 8/75 |
| 2021/0240825 | A1* | 8/2021 | Kutt | G06F 8/42 |
| 2021/0357307 | A1* | 11/2021 | Deng | G06F 11/362 |
| 2021/0357762 | A1* | 11/2021 | Clement | G06N 3/045 |
| 2022/0012021 | A1* | 1/2022 | Abhinav | G06N 3/044 |
| 2022/0019410 | A1* | 1/2022 | Cangea | G06N 3/045 |

* cited by examiner

*Primary Examiner* — Andrew M. Lyons
(74) *Attorney, Agent, or Firm* — Genius Patent APC; Bruce Angus Hare

(57) ABSTRACT

A device includes one or more processors configured to: receive source code including a section of source code associated with at least one bug or vulnerability; generate a formatted code section based at least partly on the section of source code associated with at least one bug or vulnerability; identify a matching patch model based on the formatted code section; provide the formatted code section to the matching patch model; receive a remedied code section from the matching patch model; and apply the remedied code section to the section of source code associated with at least one bug or vulnerability. Generating the formatted code section based at least partly on the section of source code associated with at least one bug or vulnerability includes: dividing the section of source code into sub-elements; associating type information to the sub-elements to generate tokens; and mapping each token to a unique identifier.

14 Claims, 17 Drawing Sheets

AUTOMATED BUG FIXING USING DEEP LEARNING

CROSS-REFERENCE TO RELATED APPLICATIONS

This application claims priority to U.S. Provisional Patent Application Ser. No. 63/079,785, filed on Sep. 17, 2020.

STATEMENT REGARDING FEDERALLY SPONSORED RESEARCH OR DEVELOPMENT

This invention was made with government support under HQ0860-20-C-7017 and HQ0860-21-C-7115 awarded by the Missile Defense Agency. The government has certain rights in the invention.

BACKGROUND

Software developers inadvertently create flaws in the form of bugs and/or vulnerabilities when writing source code. Bugs in source code may result in the source code becoming non-functional or may cause the source code to function improperly. Vulnerabilities in source code may render the code susceptible to hacking. As a solution to identified bugs and vulnerabilities in source code, developers may create "patches," or portions of new code which replace the portions of original code which result in the bugs. Patches for the source code may be developed and applied manually, however, manual patch generation is costly and time-consuming.

Therefore there exists a need for ways of identifying bugs in source code and automatically generating and applying patches to fix the identified bugs.

BRIEF DESCRIPTION OF THE SEVERAL VIEWS OF THE DRAWING

The novel features of the disclosure are set forth in the appended claims. However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments provide ways to identify bugs and/or vulnerabilities in source code and automatically generate and implement remedies to fix the bugs and/or vulnerabilities using patch models. Some embodiments generate such patch models using deep learning encoder-decoder architectures that may utilize recurrent neural networks (RNNs) or multi-head attention.

Figure 1:
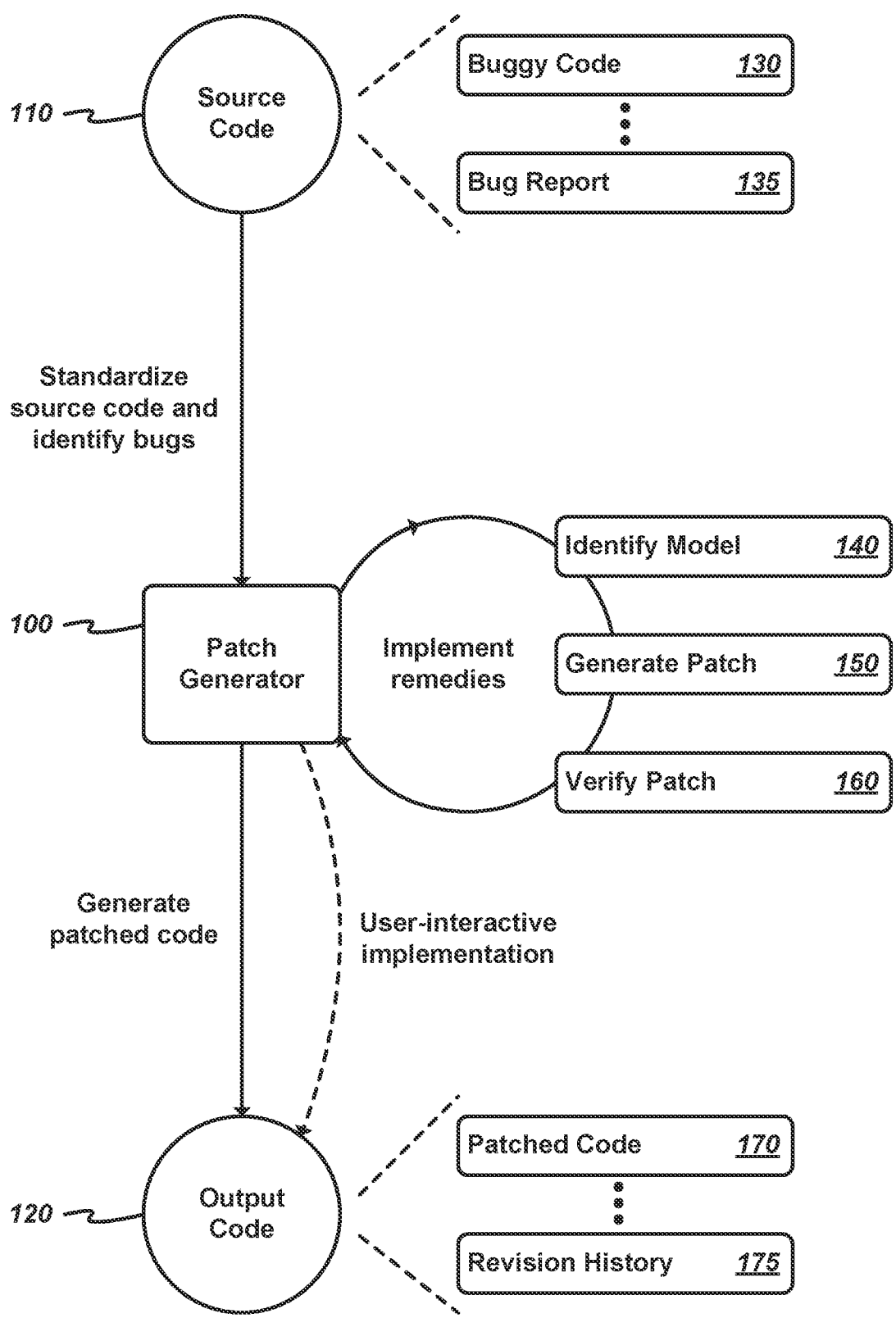
FIG. 1 illustrates an example overview of one or more embodiments described herein, in which a patch generator automatically generates and applies patches to source code.

FIG. 1 illustrates an example overview of one or more embodiments described herein, in which a patch generator 100 may automatically generate and apply one or more patches to source code 110. As shown, patch generator 100 may receive source (or "target") code 110, implement various remedies, and generate output code 120.

Patch generator 100 may be an end-to-end solution which may fix, optimize, or otherwise update source code 110. Patch generator 100 may be able to receive source code 110 in various formats (e.g., compiled, uncompiled, etc.), various languages (e.g., Java, JavaScript, C, C++, C#, Objective C, and/or Python, etc.), and/or having other varying attributes. Patch generator 100 may evaluate source code 110 during development in order to implement and/or verify various remedies or other improvements to generate optimized, improved, and/or otherwise updated output code 120.

Patch generator 100 may be implemented using various appropriate hardware and/or software resources. Patch generator 100 may be implemented as, for example, a standalone tool or an extension to existing software, such as a plugin associated with an inactive development environment (IDE) or an extension associated a source code editing application. Patch generator 100 may automatically apply patches to flawed or unoptimized source code, reducing the cost and time required to manually implement such patches.

Patch generator 100 may be implemented in a continuous integration/continuous deployment (CI/CD) environment in which automation and monitoring of development of new code is constant. CI/CD environments reduce the time required to identify and merge new code additions to software. Patch generator 100 may continuously monitor new code as it is being written. If a bug is identified in the code, the code may be provided to patch generator 100 to automatically generate a patch in real-time. In some embodiments, patch generator 100 may be implemented as an extension for a commercial source code editor, such as Visual Studio Code, among other options.

Source code 110 may be associated with various entities, such as end-user applications, distributed services (e.g., APIs), and/or other appropriate resources. Source code 110 may be received in various appropriate formats, such as a data stream, file, etc. Source code 110 may be received from various appropriate resources, such as a user device, server, file, database, etc. Source code 110 may be associated with a user such as a software developer and may be received by patch generator 100 for analysis and/or modification.

Source code 110 may include one or more sections of unoptimized, flawed, and/or buggy code 130. Source code 110 may be associated with one or more bug reports 135 that may identify attributes of the buggy code 130. Such attributes may include, of instance, the type (e.g., syntax, invalid operation, unoptimized function call, etc.) and/or location (e.g., a set of line numbers) of bugs or vulnerabilities. In some embodiments, patch generator 100 may identify buggy code 130 in source code 110 and/or generate bug report 135 (e.g., by analyzing each line of source code 110).

Table 1, below, provides various example bugs and fixes that may be applicable to various examples described throughout this disclosure.

TABLE 1

| Model ID | Type | Example Code |
|---|---|---|
| MALLOC - Missing sizeof | Bug | int *data = malloc(10); |
| | Fix | int *data = malloc(10 * sizeof(int)); |
| MALLOC - No dereference | Bug | int *data = malloc(sizeof(data)); |
| | Fix | int *data = malloc(sizeof(*data)); |
| MEMCPY - Wrong sizeof | Bug | memcpy(a->b, &val, sizeof(a)); |
| | Fix | memcpy(a->b, &val, sizeof(a->b)); |
| MEMORY OP - Invalid length | Bug | unsigned int buffer[BUFLEN]; memset(buffer, 0, BUFLEN_MAX); |
| | Fix | unsigned int buffer[BUFLEN]; memset(buffer, 0, BUFLEN); |

As shown, Table 1 may include patch model identifiers, element type, and example code. Various other elements, such as performance metrics (e.g., an accuracy score), sample size (e.g., number of remedies implemented using the patch model), etc. may be included in such a table and/or associated models. Such model information may be stored in various appropriate ways, such as using a lookup table or database. In this example, patch model identifiers are presented as text values. Such identifiers may include, and/or be associated with, various unique strings (e.g., serial numbers) that may be used to identify each patch model. Example code includes code related to bugs and fixes, as shown. Performance metrics or scores (e.g., an "accuracy" score) may indicate the typical matching percentage (in content and/or order) between the generated patch code and the known patch bug fix code.

In the example of FIG. 1, source code 110 includes at least one buggy code section 130 and a bug report 135. Source code 110 may include various other elements, metadata, or code sections, including, for example, header information, revision history, author information, non-buggy code sections, previously applied patch models, user preferences, etc. Source code 110 may include any number of instantiations of each section type. For instance, source code 110 may include any number of sections of buggy code 130. As another example, source code 110 may be associated with multiple bug reports 135 (e.g., each report from a different evaluation resource). Source code 110 and/or associated elements and/or data may be distributed across multiple files, devices, systems, and/or other resources.

Patch generator 100 may standardize the received source code 110 and identify bugs associated with the source code 110. Source code standardization may include formatting, tokenization of code elements, and vectorization of tokenized elements associated with received source code 110. Such standardization will be described in more detail in reference to FIG. 3 below.

As shown in FIG. 1, in order to implement remedies, optimize, and/or otherwise update source code 110, patch generator 100 may identify models 140, generate patches 150 based on the identified models, and verify the generated patches 160. Models (or "patch" models, or "remedy" models) may be generated as described below in reference to FIG. 3 and/or may be received from (and/or generated based on data received from) various external resources (e.g., a database of bugs and associated fixes).

Returning to FIG. 1, patch generator 100 may identify models 140 in various appropriate ways, using various appropriate resources. For instance, bug report 135 may include a listing of bugs indicating relevant attributes such as bug type, line number(s), attributes of model training data, etc. Patch generator 100 may utilize a lookup table or other appropriate resource to identify appropriate models for each bug included in bug report 135. For example, lines of buggy code may be compared to code snippets associated with various patch models (e.g., the code examples from Table 1) to identify matching patch models. As another example, patch generator 100 may analyze attributes of buggy code 130 to identify matching models, such as by comparing attributes of available models to the attributes of the buggy code 130. As still another example, patch generator 100 may format and tokenize source code 110 and compared the formatted and tokenized source code to similarly formatted and tokenized matching code associated with a patch model, where a matching score or metric may be calculated based on matching elements, order of elements, and/or other relevant factors.

Each bug may be matched to a patch model based on such analysis (e.g., by calculating a matching metric between code snippets associated with the bug and/or available patch models). For example, a model associated with a particular syntax error may be identified as matching buggy code 130 having a similar syntax error if no absolute match is available. Identified or matching models may be retrieved from a resource such as a model database associated with patch generator 100, local or remote storage, server, API, etc.

Patch generator 100 may generate each patch 150 using one or more of the identified models 140. Generating patches 150 may include generating, updating, moving, removing, and/or otherwise modifying lines or sections of source code. For instance, a model 140 may include a code snippet that may replace a code snippet associated with buggy code 130. Patch generation and/or modification of source code 100 may include extraction of various source code parameters (e.g., variable values, text, etc.) that may be used to implement each patch based on an identified model 140.

Model identification and/or patch generation may include calculation of one or more confidence factors or metrics for each patch or patch model (e.g., a calculated probability of success). In some embodiments, multiple potential patches and/or models may each be associated with such a confidence metric.

Each patch, and/or associated information such as a confidence score, code snippet, etc. may be presented for evaluation by an end user such as a software developer. Selections of patches may be received (e.g., a list of several potential patches and confidence scores may be provided, from which the end user may accept and/or reject one or more patches for application).

Some embodiments of patch generator 100 may automatically implement some or all patches. For instance, all patches with a confidence score greater than a specified threshold may be automatically applied, while patches with a confidence score less than or equal to the specified threshold may only be applied based on user selections or instructions. As another example, if multiple patches are identified for a section of buggy code 130, the patch with a highest confidence score may be automatically selected by patch generator 100. For user-interactive implementation, only approved or selected patches may be applied. Such an approach may allow a user such as a developer to evaluate sets of patches independently. User-interactive implementations may allow for granular user feedback, such as parameter updates, updated code snippet sections, etc. Patch generator 100 may generate patches at least partly based on such user feedback (e.g., by replacing a specified code section with an updated code section provided by a user).

Patch generator 100 may verify each patch 160 to determine whether the generated patch 150 fixes the buggy code 130 section of source code 110. Patch verification may include checking the generated patch 150 for new errors, checking the patched code for the original error, and/or checking the patched code for new errors. Patch verification may utilize various resources to test or verify each patch, such as any number of source code evaluation tools. If patch verification fails, another patch may be generated (e.g., by selecting a different patch model, by modifying parameters passed to the patch model, by updating the patch model, by receiving updated user feedback, etc.) and evaluated until a patch is successfully verified.

The verified and/or accepted patches may be used to modify or replace the buggy code 130 to generate patched code 170 included in output code 120. A revision history 175 including a listing of updates implemented by patch generator 100 may be used to train the various deep learning models available to the patch generator 100.

In this example, output code 120 includes at least one patched code section 170 and a revision history 175. Output code 120 may include various other elements, metadata, or code sections, including, for example, header information, unpatched code sections, author information, listings of applied patch models, user preferences, etc. Output code 120 may include any number of instantiations of each section type. For instance, output code 120 may include any number of sections of patched code 170. As another example, output code 120 may include metadata listing previously applied patches. Output code 120 and/or associated elements and/or data may be distributed across multiple files, devices, systems, and/or other resources.

Figure 2:
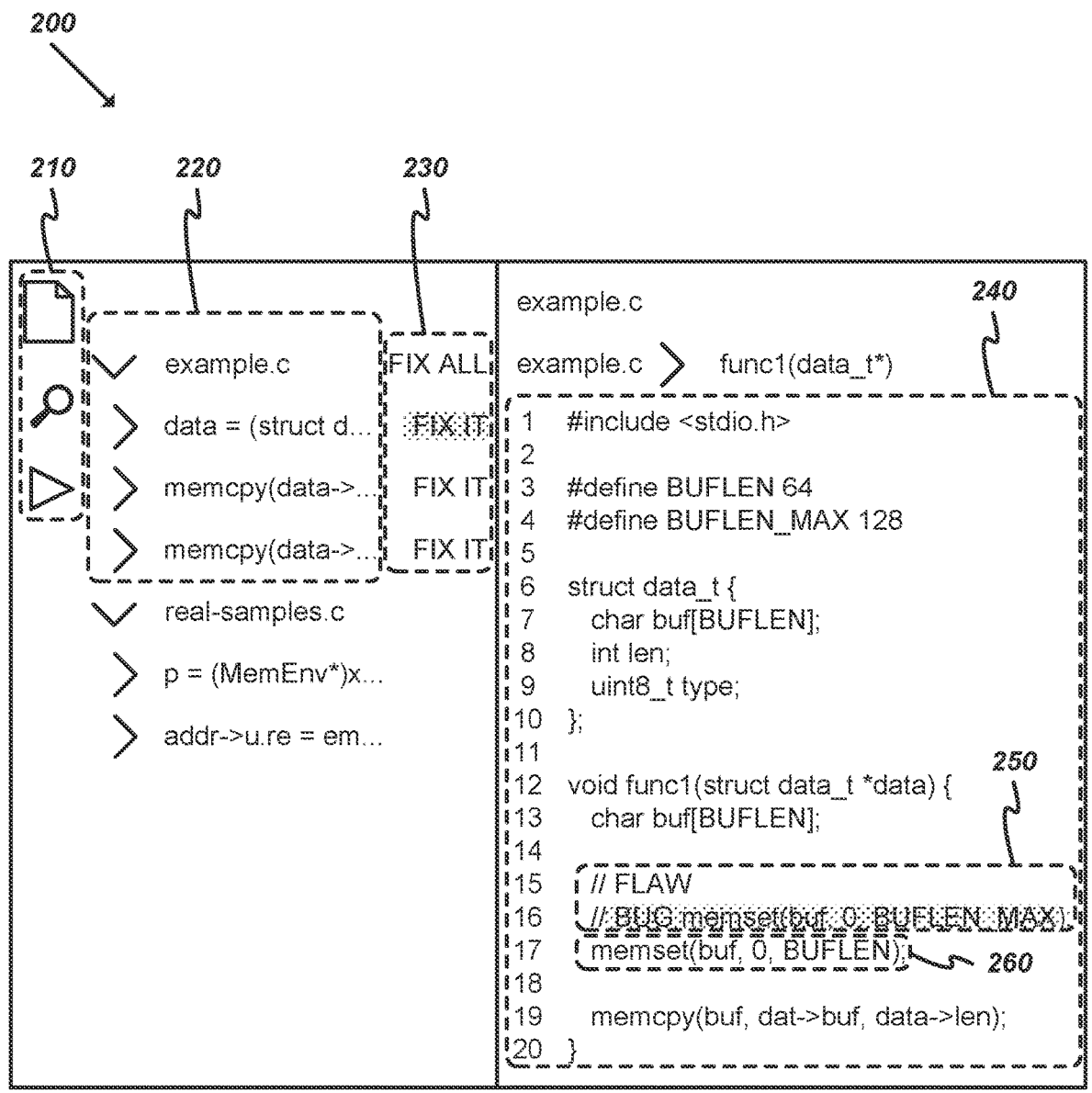
FIG. 2 illustrates a front elevation view of a graphical user interface (GUI) according to one or more embodiments described herein.

FIG. 2 illustrates a front elevation view of a graphical user interface (GUI) 200 according to one or more embodiments described herein. Such a GUI 200 may be used to provide user-interactive implementation of patches. GUI 200 may be provided by a resource such as patch generator 100, and/or associated resources such as a development environment.

In this example, GUI 200 may include a set of tools or other features 210, a listing of bugs 220, user selectable elements 230, a code display area 240, a section of buggy code 250, and a section of remedied code 260.

Tools or other features 210 may include various appropriate elements, such as open file, save file, search, go to next bug or section, undo, re-do, etc. The listing of bugs 220 may include sections of code or other indicators of elements that may be corrected, optimized, and/or otherwise updated. Some embodiments may filter the listing of bugs 220 in various appropriate ways. For instance, bugs associated with remedies having a high accuracy or confidence of success metric (and/or other performance metric or score) may be automatically implemented by patch generator 100 and may not be displayed in the listing of bugs 220.

User selectable elements 230 may include various tools and/or features, such as bug implementation elements. In this example, a received user selection (of "FIX IT") is indicated by the fill pattern behind the text. The associated section of source code (beginning with "data ="), and/or other appropriate elements and/or nearby sections of code, may be displayed in code display area 240. In this example, code display area 240 includes a set of numbered lines, from one to twenty.

The section of buggy code 250 is indicated by comments and shading in this example. The section of buggy code 250 may be automatically removed from the updated code, saved as metadata or comment information, and/or otherwise managed.

The section of remedied code 260 may be generated and placed in the appropriate location relative to the other code sections shown in code display area 240. In this example, a single line of flawed code is replaced by a single line of remedied code.

One of ordinary skill in the art will recognize that GUI 200 may be implemented in various different ways including various different elements without departing from the scope of the disclosure. For instance, if multiple potential remedies are available for a particular bug, a pop-up window may be generated, allowing a user to select among the various options.

Figure 3:
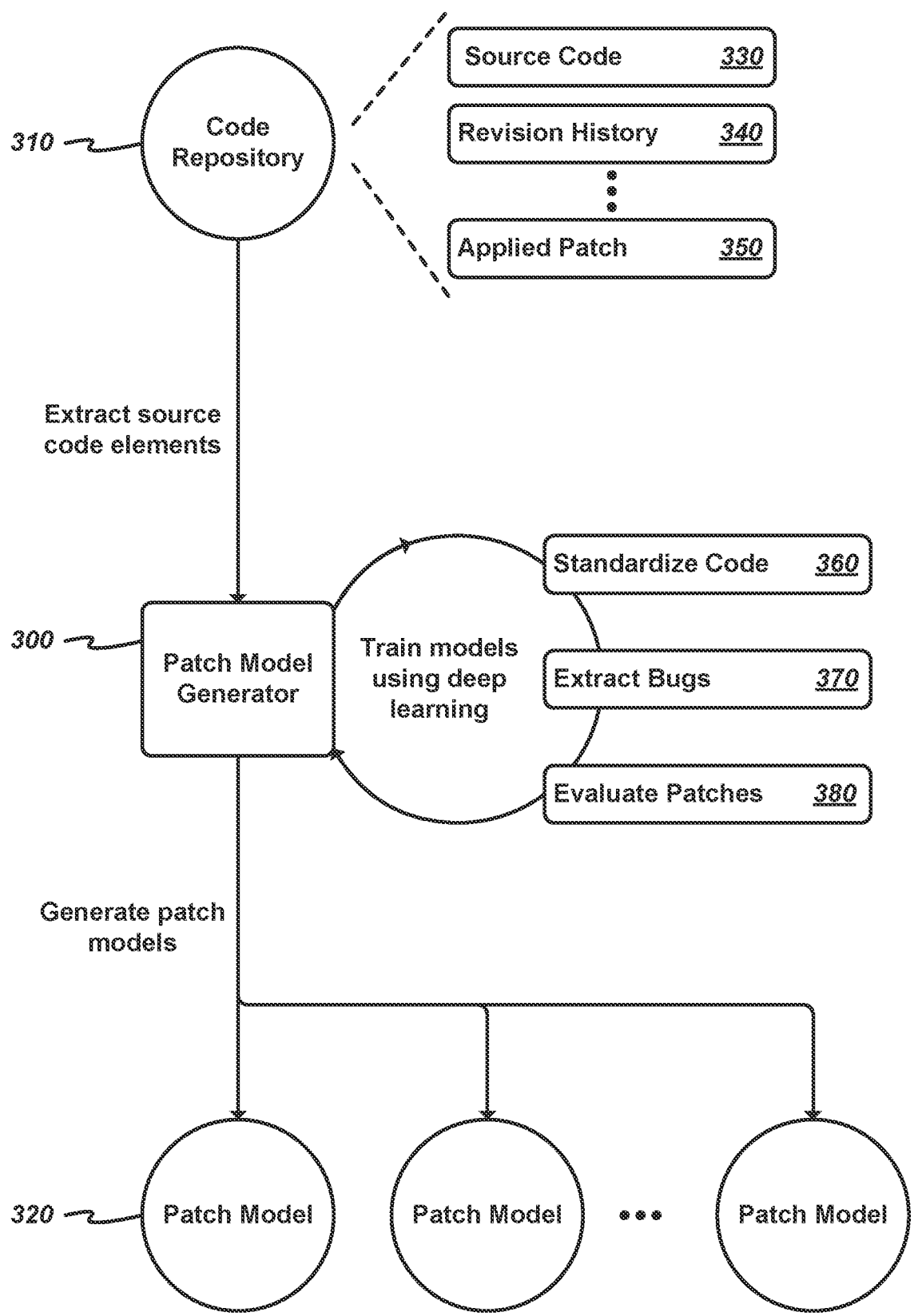
FIG. 3 illustrates an example overview of one or more embodiments described herein, in which a patch model generator builds patch models using deep learning training.

FIG. 3 illustrates an example overview of one or more embodiments described herein, in which a patch model generator 300 analyzes a code repository 310 to build patch models 320 using deep learning training. Such patch models 320 may be used to generate patched or otherwise updated code to resolve buggy code 130 as described above.

Patch model generator 300 may be an end-to-end solution which may train, generate, and/or otherwise update patch models 320 based on data received from one or more code repositories 310. The deep learning used by some embodiments of patch model generator 300 to generate patch models 320 may utilize resources such as sequence-to-sequence (STS) modeling, masked language modeling (MLM), next sentence prediction (NSP) modeling, transformers, and/or multi-head attention among other options.

Patch model generator 300 may be able to receive data from code repository 310 in various formats (e.g., compiled, uncompiled, etc.), various languages (e.g., Java, JavaScript, C, C++, C#, Objective C, and/or Python, etc.), and/or having other varying attributes. Patch model generator 300 may evaluate code repository 310 under various appropriate circumstances (e.g., models may be updated and/or generated at periodic intervals, as new data is received at code repository 310, based on user inputs, etc.) to generate and/or update patch models 320.

Patch model generator 300 may be implemented using various appropriate hardware and/or software resources. Patch model generator 300 may be implemented as, for example, a standalone tool or an extension to existing software, such as a plugin associated with an interactive development environment (IDE), or a static source code analysis tool. Patch model generator 300 may be a sub-element of, and/or otherwise associated with, patch generator 100. Patch model generator 300 may automatically generate, identify, and/or otherwise cultivate patch models 320 associated with flawed or unoptimized source code, reducing the cost and time required to manually generate such patch models.

Each code repository 310 may include various elements, such as source code 330, revision histories 340, applied patches 350, and/or other appropriate elements (e.g., user feedback, performance metrics, etc.). Each code repository 310 may include any number of files or otherwise associated data elements. Some or all elements of code repository 310 may be generated, collected, and/or otherwise provided by patch model generator 300. For instance, patch model generator 300 may receive a set of source code 330 files and analyze the files to generate revision histories 340 (e.g., by comparing different versions of source code files) and applied patches 350 (e.g., by analyzing metadata associated with the source code files) associated with the source code 330. Applied patches 350 may include manually implemented patches (e.g., developer implemented patches) and/or patches generated by a resource such as patch generator 100. Each code repository 310 may include instantiations of source code associated with, for example, ten thousand or more projects.

Source code 330, and/or other elements of code repository 310, may be received from various publicly available resources, such as Github, Juliet Test Suite, GitLab, or Bitbucket, among other options. Source code 330 may be similar to source code 110 described above. Each instantiation of source code 330 (e.g., a file, function, code snippet, etc.) may include or otherwise be associated with other elements of code repository 310, such as a revision history 340, applied patches 350, one or more bug reports which may detail known bugs and/or vulnerabilities, if any, and/or other appropriate elements.

As shown, patch model generator 300 may extract source code elements from code repository 310 in order to train models using deep learning. Individual source code elements may include, for instance, sections of source code 330 associated with a single project or set of files (e.g., different versions of a source code file that has been modified over time).

The patch model generator 300 may train patch models 320 using deep learning by standardizing code 360, extracting bugs 370, and evaluating patches 380. Each model may be trained using an encoder-decode deep learning architecture utilizing, for example, set of RNNs where the output from a previous step is used as an input to a current step, multi-head attention modules where inputs are associated with embedded position information and processed in parallel, and/or other appropriate elements.

The patch model generator 300 may standardize code 360 received from code repository 310 to aid analysis across programming language, platform or operating system, coding style (e.g., new lines, spacing, etc.), and/or other such variabilities in code format. In this example, code is standardized for use in training models, but similar code standardization may be performed for matching bugs to patch models and/or otherwise evaluating source code using patch generator 100.

Patch model generator 300 may standardize code 360 in various appropriate ways, depending on various relevant factors. The patch model generator 300 may divide received source code into sections (e.g., individual lines of code, code associated with a single function, etc.) for analysis. Each code section may be divided into sub-elements, and each sub-element may be mapped to a token. Code standardization is described in more detail in reference to FIG. 4 below.

Returning to FIG. 3, patch model generator 300 may extract bugs 370 from the standardized code sections. Such bug extraction may be based on various relevant factors, such as associated bug reports, results from static source code analysis tools, revision history, previously applied patches, etc. In some embodiments, bugs may be extracted by matching sections of standardized code to sections of standardized code associated with a patch model. For instance, sections of code may be compared to the example bug code from Table 1, in order to identify an associated patch model identifier.

The patch model generator 300 may identify and evaluate patches 380, if any. Such patches may be identified, for instance, by comparing source code revisions with identified bugs to updated revisions where at least some of the identified bugs have been remedied.

The patch model generator 300 may generate patch models by training the deep learning model as described in more detail in reference to FIG. 5 below. Returning to FIG. 3, each patch model 320 may be evaluated during training to determine whether the patch model 320 is acceptable for use by patch generator 100. The patch model generator 300 may simulate a translation between the original buggy code and associated patched code to build each patch model 320. The effectiveness of each patch model 320 (and/or other evaluation metrics) may be validated by running a section of buggy code with a known patch through the patch model 320 and determining if the patch model 320 produces the correct patch.

Each patch model 320 generated by the patch model generator 300 may include a set of trained RNNs, a pair of multi-head attention models, and/or other appropriate components depending on the type of deep learning architecture(s) used. Each patch model 320 may include and/or be associated with elements or attributes such as a unique identifier, example code sections, tokenized and/or vectorized content, and/or other appropriate elements or attributes.

Figure 4:
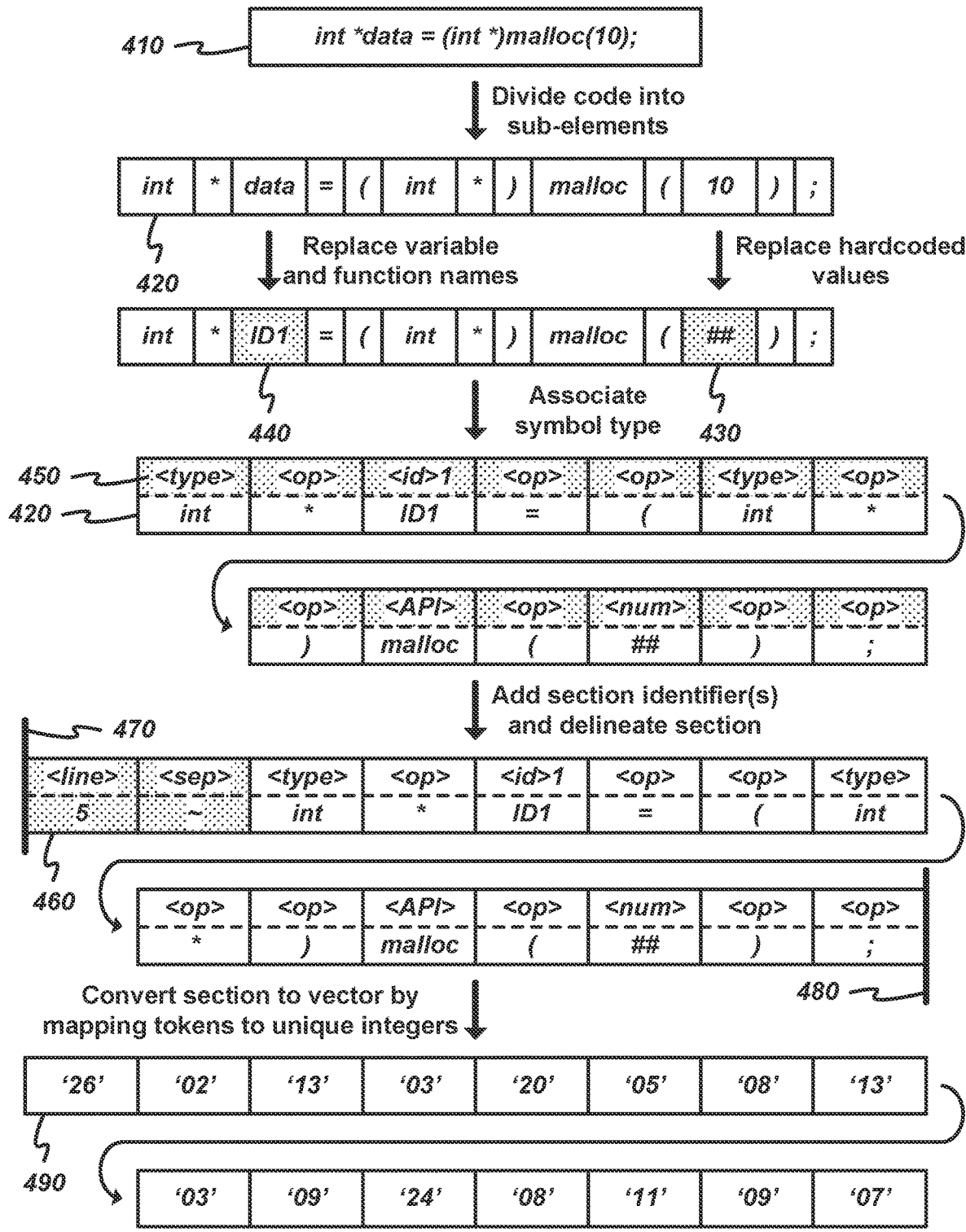
FIG. 4 illustrates an example overview of one or more embodiments described herein, in which a section of code is formatted for analysis and processing.

FIG. 4 illustrates an example overview of one or more embodiments described herein, in which a section of code 410 is formatted for analysis and processing. Source code 110 may be received as plain text, or may be converted into plain text by patch generator 100 and/or patch model generator 300. In this example, the section of code 410 is a single line of code, however, different embodiments may include different types of sections, such as a number of lines of code, code associated with a particular function, a code section defined by delimiters, etc.

Each section of code 410 may be processed in various appropriate ways in order to standardize formatting, order of operations, etc. For instance, lines of code with no associated text (e.g., carriage returns or new lines) may be removed. As another example, spacing between elements may be standardized (e.g., spaces may be added or removed based on various appropriate factors, such as nesting, previous character type, number of consecutive spaces, etc.).

As one example of code processing, statements may be simplified. For instance, a nested statement with multiple operations in a single line of code (e.g., "if ((buf=malloc (sizeof(uint8_t)* len))==NULL { . . . ") may be simplified by converting the single line of code to multiple lines of code with fewer operations per line (e.g., "buf=malloc (sizeof(uint8_t) * len); if(buf==NULL) { . . . ").

As another example of code processing, contextual information may be added to the code (e.g., via comments). For example, the code snippet "memcpy(a, b, LEN)–> memcpy (@ID1, @ID2, @ID3);" may be converted to "memcpy(a, b, LEN)->_<API>_memcpy (_<var>_@ID1, _<var>_@ ID2,_<define>_@ID3);".

As shown, the section of code 410 may be divided into sub-elements 420. Sub-elements 420 may be generated in various appropriate ways. For instance, certain delimiters (e.g., spaces, tabs, etc.) may be used to identify divisions between sub-elements 420. As another example, strings of text (e.g., "int", "data", etc.) may be compared to values in a lookup table associated with various operations or functions. As still another example, various characters (e.g., "(", "=", etc.) may be used to identify divisions between sub-elements 420, such as by comparing the characters to characters in a lookup table.

Hardcoded values may be replaced with placeholders 430. Variable and function names may be replaced by unique identifiers 440. Such an approach allows for better matching between buggy code 130 and patch models 320, by ignoring inconsequential differences in hardcoded values, variable or function names, etc.

Each sub-element 420 may be associated with a symbol type 450 (e.g., "type", "operator", "identifier", "API", "number", etc.). In some embodiments, the symbol type 450 may be prepended to each sub-element 420. In this example, each symbol type includes delimiters ("<" and ">") indicating the beginning and end of the symbol type 450. Symbol types 450 may be indicated using various appropriate configurations (e.g., delimited, fixed-length types, etc.).

In some embodiments, section identifiers 460 may be added. In this example, the section identifiers 460 include "line" type identifier (with a value of "5" in this example), with an associated separation symbol ("~"). The section identifier(s) 460 may indicate a location of the section of code 410 within some source code 110 (e.g., the fifth line of code in this example).

The code section 410 may be delineated in some embodiments. In this example, a beginning 470 and ending 480 may be defined. Such section delineators may include various elements, such as a symbol type (e.g., "<BOS>" or "<EOS>"), section identifiers, etc.

Each section may be mapped to a unique integer 490 (and/or other unique identifier) in order to convert the received section 410 into a vector. Each unique identifier 490 may be mapped using a resource such as a lookup table based on the sub-element 420 content, associated symbol type 450, and/or other relevant attributes or information. In this example, the beginning 470 and ending 480 are omitted for clarity, but each converted section may include tokens (e.g., "01" and "99" indicating the beginning and end of each section). Each token 490 includes a two-digit integer in this example. Different embodiments may represent tokens using various numbers of digits, alphanumeric characters, and/or other characters, depending on various relevant factors (e.g., language type, number of operators or functions, etc.).

Figure 5:
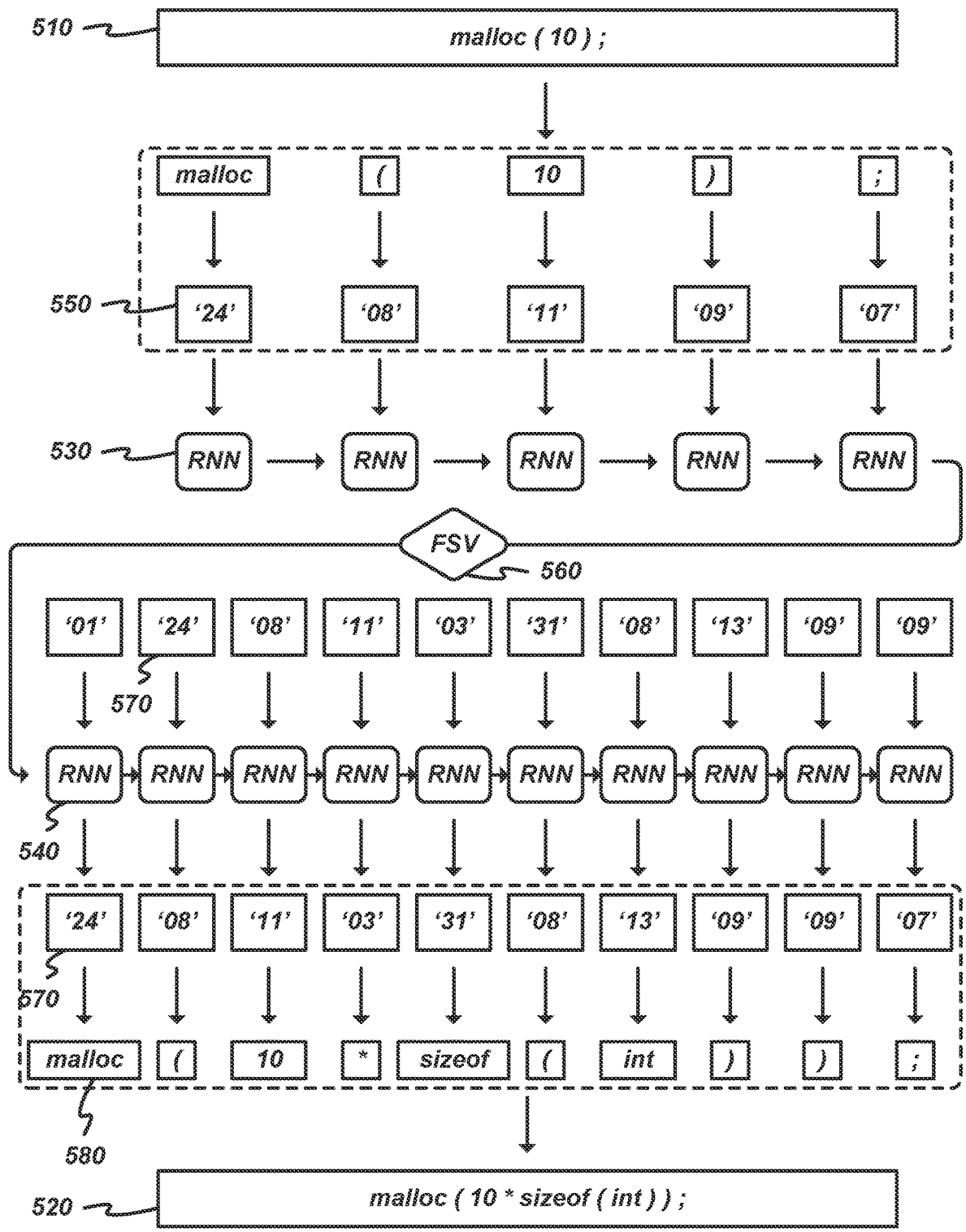
FIG. 5 illustrates an example overview of one or more embodiments described herein, in which a section of buggy code is translated to a remedy using recurrent neural networks (RNNs)

FIG. 5 illustrates an example overview of one or more embodiments described herein, in which a section of buggy code 510 is translated to a remedy 520 using RNNs 530-540. In this example, buggy code 510 "malloc(10);" is replaced by remedy 520 "malloc(10*sizeof(int));".

As described above, buggy code 510 may be divided into sections and otherwise processed to generate tokens 550. The tokens 550 may be used as input into the deep learning encoder-decoder model (e.g., encoding RNNs 530) which generates the patch that fixes the identified bug. The encoder-decoder architecture may be implemented in various different ways. For instance, using an STS model, each token 550 may be passed to encoding RNN 530. Each RNN 530 may also receive one or more outputs from another RNN 530. In this example, each RNN 530 receives a single token 550 an output of RNN 530 based on the preceding token 550 (if any).

The RNNs 530 may generate a fixed-size vector 560 that may be used to generate the remedy 520 using decoding RNNs 540. As shown, fixed-size vector 560 may be passed to the first RNN 540 in the chain of decoding RNNs 540. In addition, a beginning of section or other seed character ("01" in this example) may be passed to the first RNN 540.

The first RNN 540 may generate a decoded tokenized output 570. The tokenized output 570 may be converted to a sub-element 580, and the sub-element 580 may be added to remedy 520.

The next RNN 540 may receive the tokenized output 570 and/or other outputs of the previous RNN 540 and may, in turn, generate the next decoded tokenized output ("08" in this example). Each decoded tokenized output may be converted to a sub-element 580 and added to remedy 520. Such decoding may continue until an end of section element ("07" or ";" in this example) is reached. The completed remedy 520 may then be provided for review and/or implementation.

Figure 6:
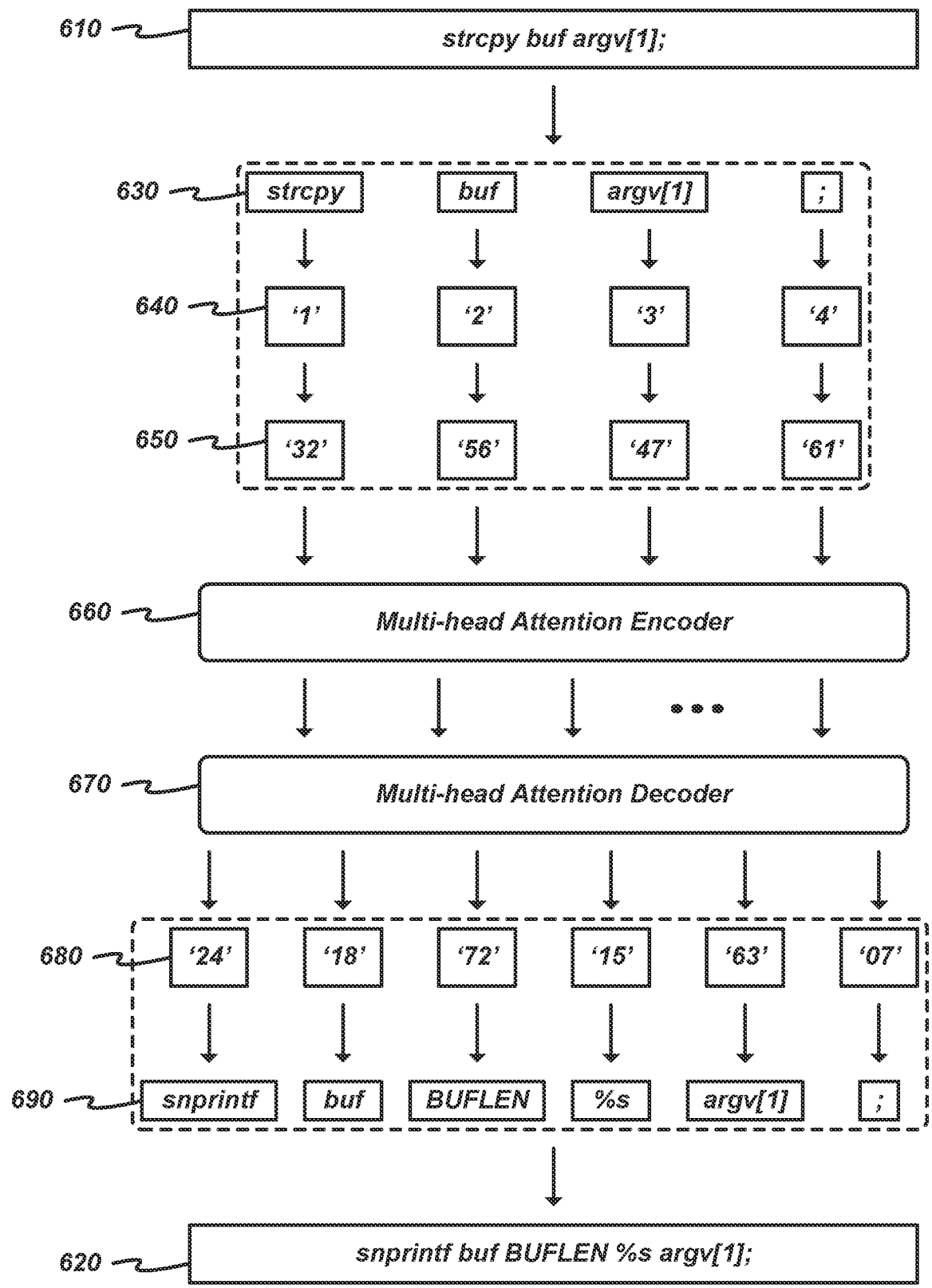
FIG. 6 illustrates an example overview of one or more embodiments described herein, in which a section of buggy code is translated to a remedy using multi-head attention.

FIG. 6 illustrates an example overview of one or more embodiments described herein, in which a section of buggy code is translated to a remedy using multi-head attention. In this example, buggy code 610 "strcpy buf argv[1];" is replaced by remedy 620 "snprintf buf BUFLEN % s argv [1];".

As described above, buggy code 610 may be divided into code text sections 630, associated with position information 640, and/or otherwise be processed to generate tokens 650. Tokens 650 may be generated based on various relevant attributes (e.g., type, identifier, etc.).

The tokens 650 may be used as input into the deep learning encoder-decoder model (e.g., the input to multi-head attention encoder 660) which generates the patch that fixes the identified bug. The encoder-decoder architecture may be implemented using multi-head attention encoder 660 and associated multi-head attention decoder 670.

The output of the multi-head attention encoder 660 may be provided as a set of inputs to the multi-head attention decoder 670. The multi-head attention decoder 670 may generate a vector of integers 680, which may be passed through a decoder embedding feature (not shown) to identify each source code token 690 and the position of each source code token 690 in remedy 620.

Figure 7:
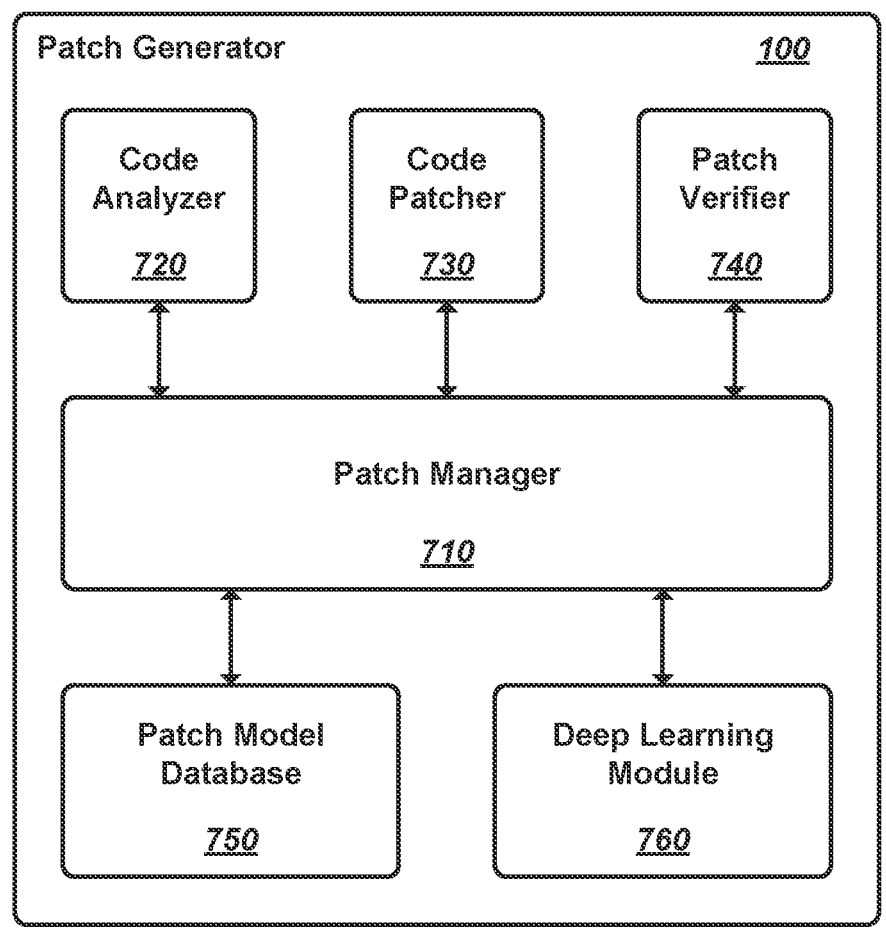
FIG. 7 illustrates a schematic block diagram of a patch generator according to one or more embodiments described herein.

FIG. 7 illustrates a schematic block diagram of a patch generator 100 according to one or more embodiments described herein. Specifically, this figure illustrates exemplary features that may be used by patch generator 100 to generate updated output code using patch models 320 trained via deep learning. As shown, patch generator 100 may include a patch manager 710, a code analyzer 720, a code patcher 730, a patch verifier 740, a patch database 750, and a deep learning module 760.

Patch manager 710 may interact with and/or direct the operation of the various other modules of patch generator 100. Patch manager 710 may provide communication pathways among the various other modules of patch generator 100.

Code analyzer 720 may receive source code 110 from various appropriate repositories, files, etc. Code analyzer 720 may be able to process received code in various appropriate ways, such as by converting received code to text, dividing the received code into sections, tokenizing the code sections, etc. Code analyzer 720 may be able to extract and/or generate attributes associated with received code (e.g., code snippets, fixed size vectors, etc.) and match the attributes to various patch models 320 available via the patch database 750.

Code patcher 730 may receive sections of buggy code 130 and one or more patch models 320, and may apply the received patch models 320 to the buggy code 130 in order to generate one or more potential remedies. In some cases, code patcher 730 may automatically apply one or more of the potential remedies.

Patch verifier 740 may test and/or otherwise verify potential remedies generated by code patcher 730. A score or other metric may be generated for each potential remedy in some embodiments.

Patch model database 750 may include, and/or have access to, various available patch models and/or associated information (e.g., code snippets, types, etc.). Patch model database 750 may include local storage, network-accessible resources (e.g., one or more APIs), and/or other appropriate elements.

Deep learning module 760 may receive listings of identified bugs and/or associated information such as applied remedies, patch models used, etc. Deep learning module 760 may compile user feedback in some embodiments, by, for example, identifying remedies (and associated patch models) that were implemented and/or accepted by a developer-user as opposed to remedies that were not implemented or accepted.

Figure 8:
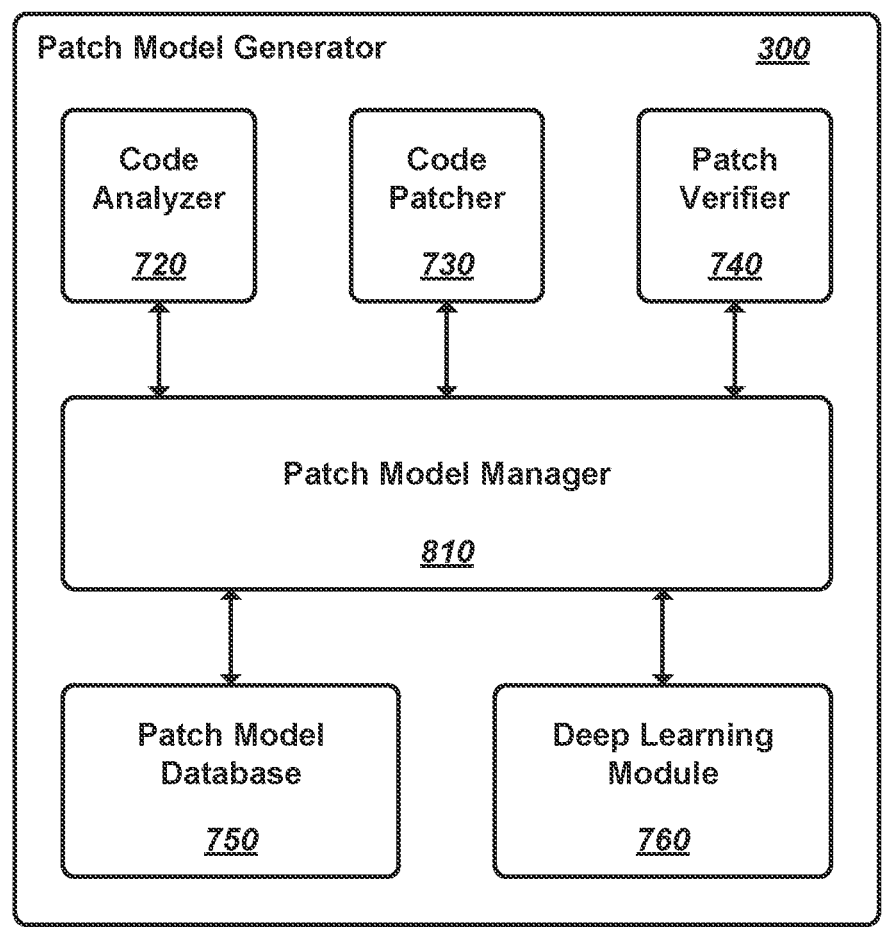
FIG. 8 illustrates a schematic block diagram of a patch model generator according to one or more embodiments described herein.

FIG. 8 illustrates a schematic block diagram of a patch model generator 300 according to one or more embodiments described herein. As shown, the patch model generator 300 may include a patch model manager 810, code analyzer 720, code patcher 730, patch verifier 740, patch model database 750, and deep learning module 760.

Patch model manager 810 may interact with and/or direct the operation of the various other modules of patch model generator 300. Patch model manager 810 may provide communication pathways among the various other modules of patch generator 100.

Code analyzer 720 may download and parse code repositories 310 and use the code samples from repositories 310 to generate a patch dataset including buggy lines of source code and/or associated remedies. In some embodiments, code analyzer 720 may include one or more commercially available bug check applications, such as Cppcheck, Fortify, and/or SonarQube, among other options. As above, code analyzer 720 may generate tokenized code sections for analysis and/or use by other elements. Such tokenized code sections may include buggy code sections and associated remedied code sections. In some embodiments, code analyzer 720 may analyze source code revision history to identify revisions including bugs and revisions that eliminated such bugs using various remedies.

Patch verifier 740 may test and/or otherwise verify potential patch models (and/or patches generated using such models) generated by patch model manager 810 and/or deep learning module 760. A score or other metric may be generated for each patch model in some embodiments. Patch models 320 may be evaluated in various appropriate ways before being included in a patch model database 750 used for application of patches to source code. For instance, patch verifier 740 may determine whether a patch model 320 remedied a bug. As another example, patch verifier 740 may generate an accuracy or effectiveness score for each patch model.

Each patch model 320 included at patch model database 750 may be associated with various attributes, such as code snippets, associated function(s), performance scores and/or evaluation metrics, and/or other relevant information.

Deep learning module 760 may receive listings of identified bugs and/or associated information such as applied remedies. Deep learning module 760 may train patch models using the identified bugs and associated fixes. Such deep learning may include training of one or more sets of RNNs, a multi-head attention encoder-decoder pair, and/or other appropriate elements.

As a use example, the Juliet Test Suite includes code samples with over one hundred types of bug and/or vulnerability. The Juliet Test Suite includes "good" functions—functions without bugs and/or vulnerabilities—as well as corresponding "bad" functions—functions with bugs and/or vulnerabilities. The bad function may be extracted and treated as the origin source code, with the good function subsequently representing the fixed code. A function-to-function comparison may be performed to extract the changes that fix the bad code. The patch which fixes the buggy code may be extracted from these comparisons, and the code and corresponding patch may be provided to the code analyzer 720. As another use example, public projects may be downloaded from Github, and comments may be used to identify "before" and "after" patch information.

Figure 9:
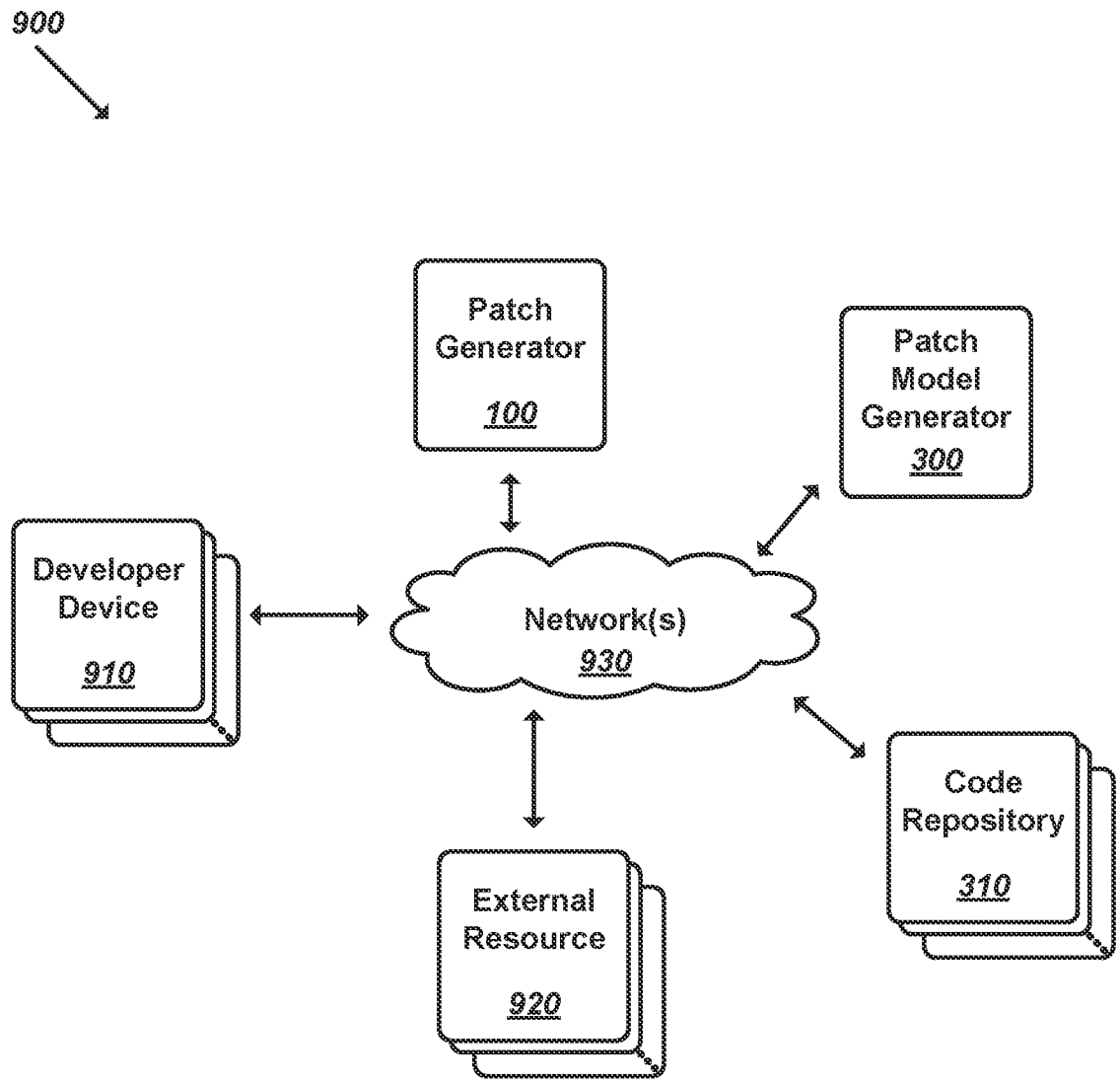
FIG. 9 illustrates a schematic block diagram of a software development environment according to one or more embodiments described herein.

FIG. 9 illustrates a schematic block diagram of a software development environment 900 according to one or more embodiments described herein. As shown, environment 900 may include one or more developer devices 910, patch generator 100, patch model generator 300, external resources 920, code repositories 310, and network(s) 930.

Developer device 910 may be any computing device capable of generating, implementing, and/or otherwise interacting with software code. For example, developer device 910 may include a personal computer (PC) or similar device.

Patch generator 100 and/or patch model generator 300 may be implemented using various devices, such as servers, storages, etc. In some embodiments, patch generator 100 and patch model generator 300 may be implemented using a single device or set of devices. Patch generator 100 and/or patch model generator 300 may be implemented as software applications running on developer device 910 in some embodiments. Patch generator 100 and/or patch model generator 300 may provide and/or utilize various resources (e.g., code analysis, patch model matching, patch verification, etc.) that are accessible via networks 930. For example, in some embodiments, patch generator 100 may be provided via a web-based interface or portal.

External resource 920 may include third-party servers, storages, and/or other devices. External resource 920 may provide software resources (e.g., bug checking software) that are accessible via networks 930.

Each code repository 310 may be a storage, server, or other similar device(s) that may store source code files and/or other associated files (e.g., bug reports, revision history, etc.).

Network(s) 930 may include various local and distributed networks, such as ethernet, cellular networks, the Internet, etc.

Figure 10:
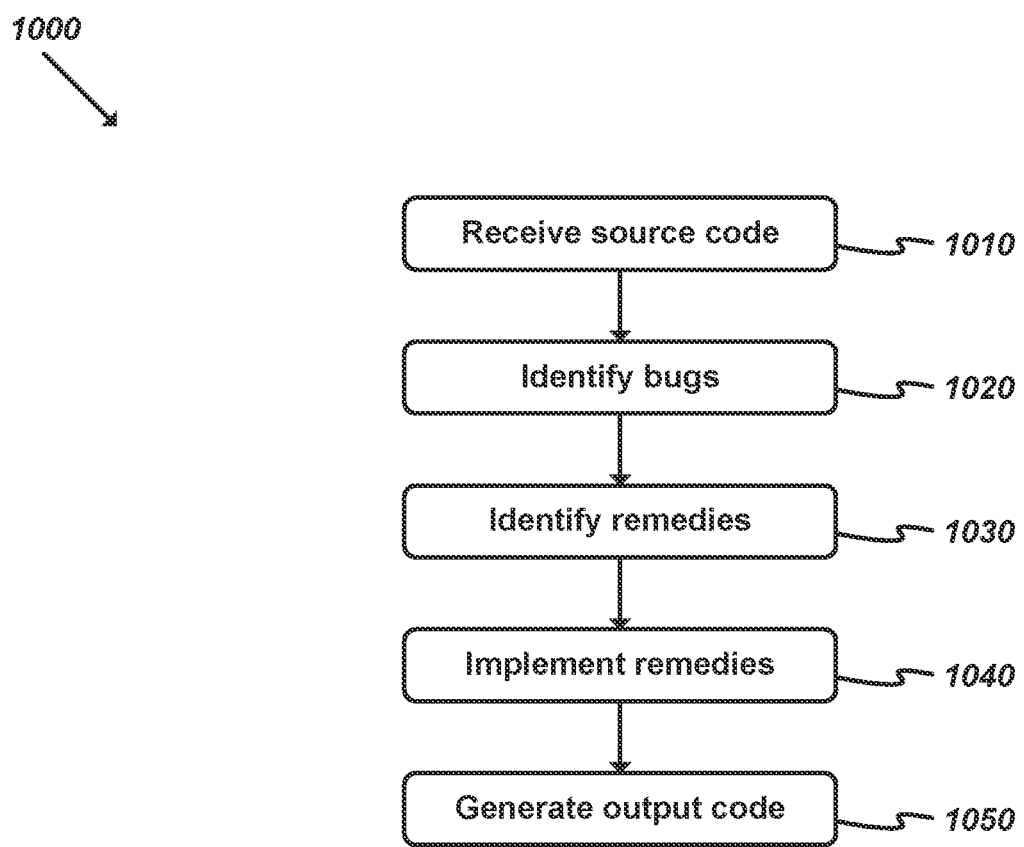
FIG. 10 illustrates a flow chart of an exemplary process for updating source code according to one or more embodiments described herein.

FIG. 10 illustrates a flow chart of an exemplary process 1000 for updating source code. The process may be performed when source code, such as source code 110, is received for analysis and update (e.g., when a source code file is uploaded or selected). In some embodiments, process 1000 may be performed by the patch generator 100.

As shown, process 1000 may include receiving (at 1010) source code. Such source code may be received from various appropriate sources, such as code repository 310, a set of one or more input files, etc. As discussed above, patch generator 100 may format and/or process the received code in various appropriate ways (e.g., by converting lines of code to tokenized vectors).

Process 1000 may include identifying (at 1020) bugs. In some embodiments, a listing of bugs may be received with the source code. Bugs may be identified in various appropriate ways (e.g., analyzing revision history and/or comments).

The process may include identifying (at 1030) remedies for the identified bugs. Remedies may be identified using algorithms and criteria provided by a resource such as deep learning module 760. Such criteria may include, for instance, listings of bug types that may include or provide example source code including a particular bug, and an associated remedy that may include or provide example code for remedying the particular bug.

As shown, process 1000 may include implementing (at 1040) remedies. Such implementation may include replacing code associated with identified bugs with remedied code. As described above, sets of RNNs, a multi-head attention encoder, and/or other appropriate deep learning model or architecture elements may be utilized to generate a fixed length vector based on a bug in the received source code and to utilize the fixed length vector to generate the remedy (e.g., by seeding a set of RNNs or a multi-head attention decoder). Implementing remedies may further include various verification and/or validation algorithms.

Process 1000 may include generating (at 1050) output code. Output code may be generated based on the received source code and any remedied code associated with identified bugs. In some embodiments, output code may be generated based on user feedback (e.g., by selecting bugs to fix).

Figure 11:
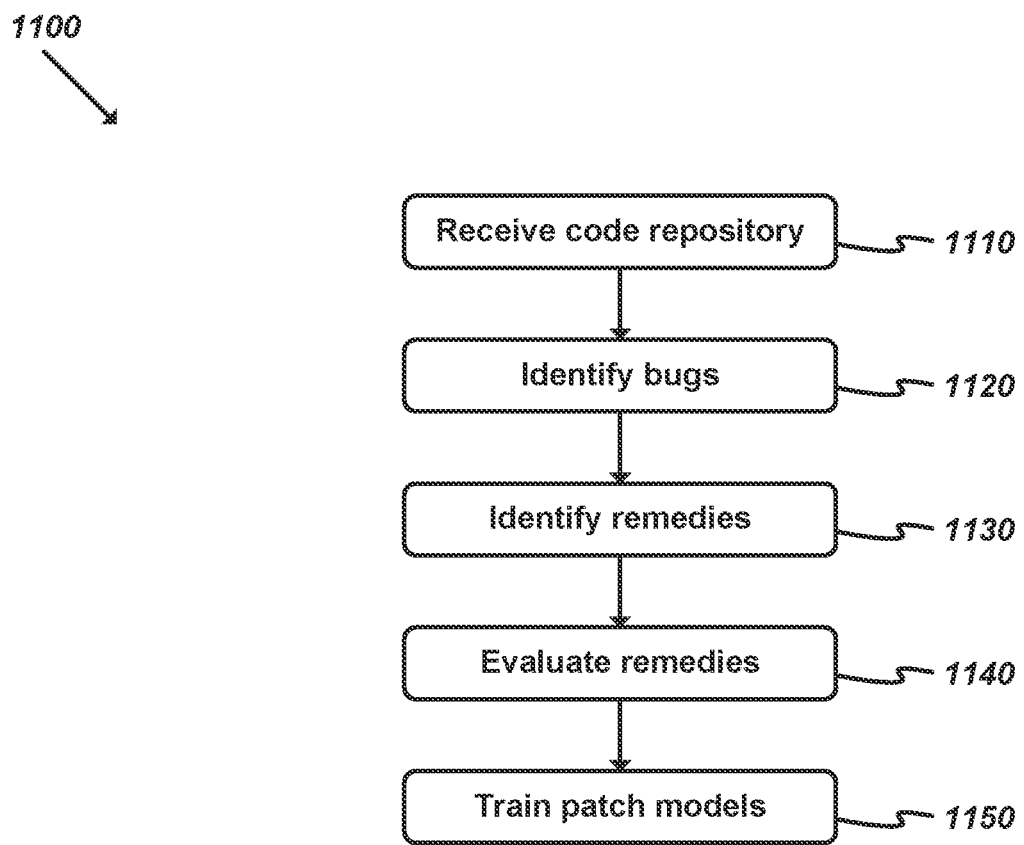
FIG. 11 illustrates a flow chart of an exemplary process for training patch models according to one or more embodiments described herein.

FIG. 11 illustrates a flow chart of an exemplary process 1100 for training patch models according to one or more embodiments described herein. Such a process may identify bugs and associated remedies and train deep learning models based on the bugs and remedies. The process may be performed whenever training data becomes available. In some embodiments, process 1100 may be performed by patch model generator 300.

As shown, process 1100 may include receiving (at 1110) a code repository, such as code repository 310. The code repository may be received via a resource such as network 930. The code repository may include any number of source code files (e.g., more than ten thousand).

Process 1100 may include identifying (at 1120) bugs in files associated with the code repository. As described above, identifying bugs may include analysis use of various software evaluation tools to generate bug reports, analysis of revision histories or comments, comparison of bug reports across revisions, etc.

The process may include identifying (at 1130) remedies for the bugs. For each identified bug, an associated remedy may be identified. Remedies may be identified in various appropriate ways, such as by comparing revisions that exhibit a particular bug to revisions that don't exhibit the bug. Revisions that eliminate a bug may be identified as remedies.

Each bug, or bug type, and associated remedies may be used to build a patch dataset for the particular bug. Such a dataset may include attributes of the bug (e.g., type, vector values, etc.) and at least one associated remedy.

As shown, process 1100 may include evaluating (at 1140) the remedies. Remedies may be evaluated in various appropriate ways. For instance, a potential remedy may be applied to a bug and the output code may be tested to see if the bug has been remedied. As another example, each remedy may be evaluated or scored based on effectiveness of eliminating bugs, matching of code snippets, and/or other relevant factors.

Process 1100 may include training (at 1150) patch models based on the bugs, remedies, and evaluation. Model training may include training one or more sets of deep learning encoder-decoder models (e.g., RNNs, multi-head attention, etc.). As described above, tokenized and vectorized bugs and associated remedies may be used to train the patch models.

Figure 12:
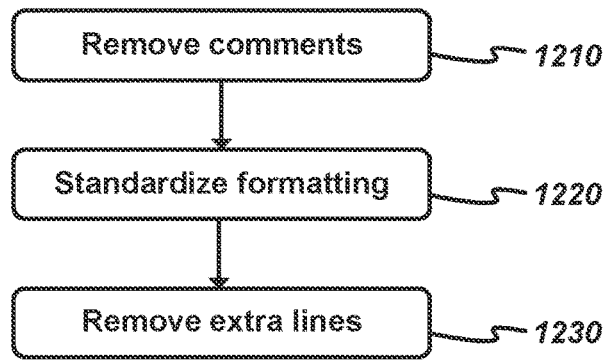
FIG. 12 illustrates a flow chart of an exemplary process for formatting source code according to one or more embodiments described herein.

FIG. 12 illustrates an exemplary process 1200 for formatting source code according to one or more embodiments described herein. Source code may be received in various formats and may include lines of code which are not relevant to the deep learning training algorithm. The source code formatting process may place the source code into a uniformly standardized format. Removing discrepancies in coding styles increases the efficiency of the deep learning training process. In some embodiments, process 1200 may be performed by patch generator 100 or patch model generator 300.

As shown, process 1200 may include removing (at 1210) comments from the source code. Removing comments from the source code may make it easier for the code to be processed and may allow the deep learning training model to operate more efficiently. Comments may be identified in various appropriate ways (e.g., by searching for characters or sets of characters associated with comments).

Process 1200 may include standardizing (at 1220) formatting of the received code. The process may enforce or otherwise implement standardized use of elements such as spaces, brackets, braces, new lines, and tabs across the code. In some embodiments, standardizing formatting may include simplifying received code, such as the nested statement example above.

The process may include removing (at 1230) extra lines from the code. Extra lines of code may be introduced to the source code during format standardization. Any extra lines of code may be removed, leaving the source code in a standardized format free of extra and non-functional code.

Figure 13:
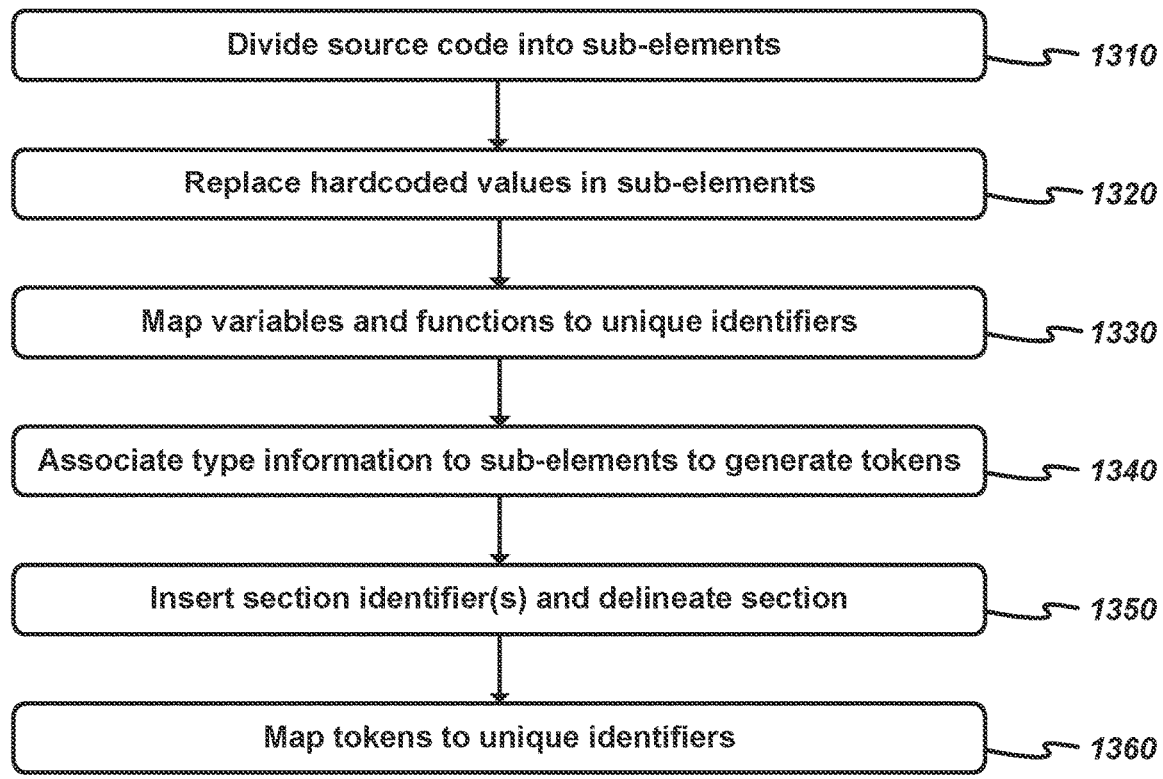
FIG. 13 illustrates a flow chart of an exemplary process for tokenizing source code according to one or more embodiments described herein.

FIG. 13 illustrates a flow chart of an exemplary process 1300 for tokenizing source code according to one or more embodiments described herein. Such source code processing may transform the formatted source code into a representation which may be utilized to train the deep learning models of some embodiments (e.g., using process 1100). Process 1300 may be performed after the source code has been formatted (e.g., using process 1200). In some embodiments, process 1300 may be performed by patch generator 100 or patch model generator 300.

As shown, process 1300 may include dividing (at 1310) the source code into sub-elements. Each section of code (e.g., section of code 410) may be split into an array of individual sub-elements (e.g., sub-elements 420), such that each sub-element is recognized as a logically separate entity.

Process 1300 may include replacing (at 1320) hardcoded values (e.g., numbers, strings, etc.) in the sub-elements. Some or all of the hardcoded numbers and strings may be replaced with symbols, such as "#" and "STR", respectively. This may reduce the number of unique symbols, reducing complexity and time required to train the deep learning models.

As shown, process 1300 may include mapping (at 1330) variables and functions to unique identifiers. Variable and function names may be replaced with a unique identifiers, such as "ID1", "ID2", etc. In some embodiments, there may be exceptions to identifier mapping. For example, functions such as libc, malloc, or fopen, among others, may be exempt from identifier Mapping.

Process 1300 may include associating (at 1340) type information to the sub-elements to generate tokens. For example, symbol types 450 may be associated with sub-elements 420. Symbol type may be prepended to the sub-elements in some embodiments. Symbol types may include, for example, type, operation, API call, or variable function ID, among other types.

Process 1300 may include inserting (at 1350) section identifier(s) and delineating the section of code. Section identifiers such as source code location information (e.g., a line number) may be added at the front of the line of code with a separation symbol (e.g., a tilde, among other options) succeeding the line number or other location information. Delineators such as, for example, beginning of section ("<BOS>") and/or end of section ("<EOS>") tokens may be inserted around the entire code section. In some embodiments, delineators such as "<error_start>" and "<error_end>" may be placed around the code line or section that includes the bug. Such symbols aid the code analyzer 720 in identifying the exact location of the bug included in the code.

The process may map (at 1360) the tokens (e.g., sub-elements 420 and appended symbol type 450) to unique identifiers (e.g., two-digit integers in this example). Tokens may be mapped to integers using a resource such as a lookup table. The resulting vector may be used to identify matching models, train models, implement remedies, and/or other appropriate functions.

The vectorized code, including the vectorized of source code and corresponding vectorized patch code may be included in the patch dataset for model training. Model training may include STS modeling, MLM, NSP modeling, transformers, and/or multi-head attention, among other options.

Figure 14:
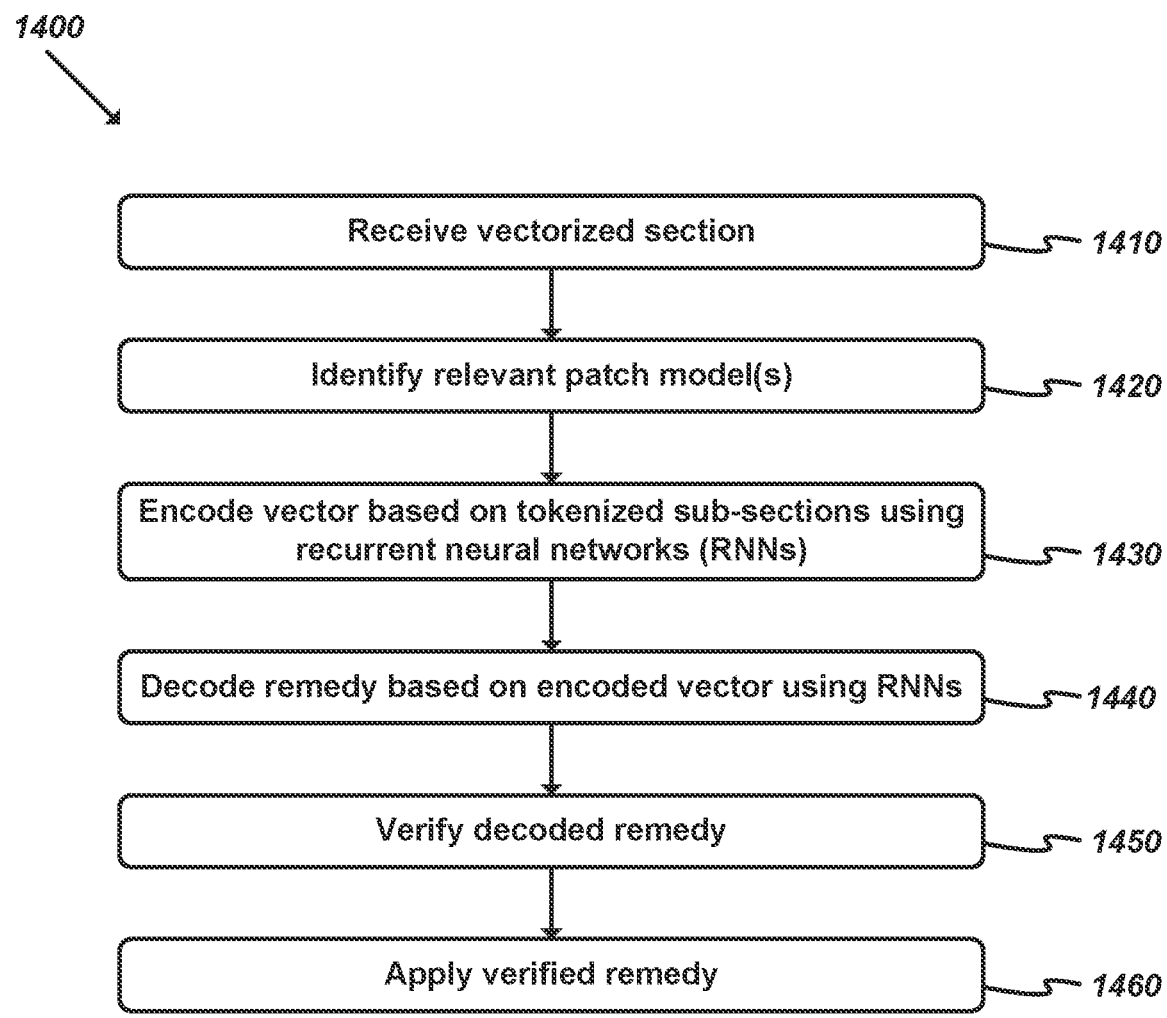
FIG. 14 illustrates a flow chart of an exemplary process for implementing code patches according to one or more embodiments described herein.

FIG. 14 illustrates a flow chart of an exemplary process 1400 for implementing code patches according to one or more embodiments described herein. The process may match a patch model to a code section identified as having one or more bugs. The process may be performed when a remedy is identified, when a developer-user selects a fix, and/or under other appropriate conditions. In some embodiments, process 1400 may be performed by patch generator 100.

As shown, process 1400 may include receiving (at 1410) a vectorized code section. Code sections may be vectorized using a process such as process 1300. The vectorized code section may include an array of numbers (e.g., two-digit integers).

Process 1400 may include identifying (at 1420) relevant patch models. Patch models may be identified by comparing the received vectorized code section to vectorized example code sections. Matching scores or metrics may include various relevant factors, such as element matching, order matching, etc. Matching may be weighted across various factors. For instance, element matching may be weighted more heavily than order matching when generating a matching score. Relevant patch models may be identified by calculating matching scores for each potential model and selecting the highest scores, scores above a specified threshold, etc.

The process may include encoding (at 1430) a vector based on tokenized sub-sections using encoders such as RNNs or a multi-head attention encoder. Such vector encoding may utilize the elements of the received vectorized code section and intermediary outputs of the RNNs as inputs to each RNN. The resulting RNN output may be a fixed-size vector (e.g., a vector including a specified number of two-digit codes), such as fixed-size vector 560. Multi-head attention may process vector encodings in parallel, using position embeddings to associate token index information.

As shown, process 1400 may include decoding (at 1440) a remedy based on the encoded vector. The encoded fixed-size vector may be used as an input to the decoder (e.g., a set of decoding RNNs, a multi-head attention decoder, etc.). The decoder may generate sub-elements for inclusion in the remedy. Each sub-element may be translated from a two-digit integer (or other representation) to a text-based element (e.g., using a lookup table). The remedy elements may be decoded and appended to (or concatenated to, or otherwise associated with) the remedy until an end of section or similar terminating character is decoded and appended to the remedy.

Process 1400 may include verifying (at 1450) the decoded remedy. Verification may include testing the output code to determine whether the bug has been eliminated. Verification may include testing output code to determine whether additional bugs have been introduced.

The process may include applying (at 1460) the verified remedy. Application may include removing the received code section (e.g., by converting the code to a comment, by deleting the code, etc.) and inserting the remedy code in place of the received buggy code section. In some embodiments, application of remedies may be based on user selections or other received inputs.

Figure 15:
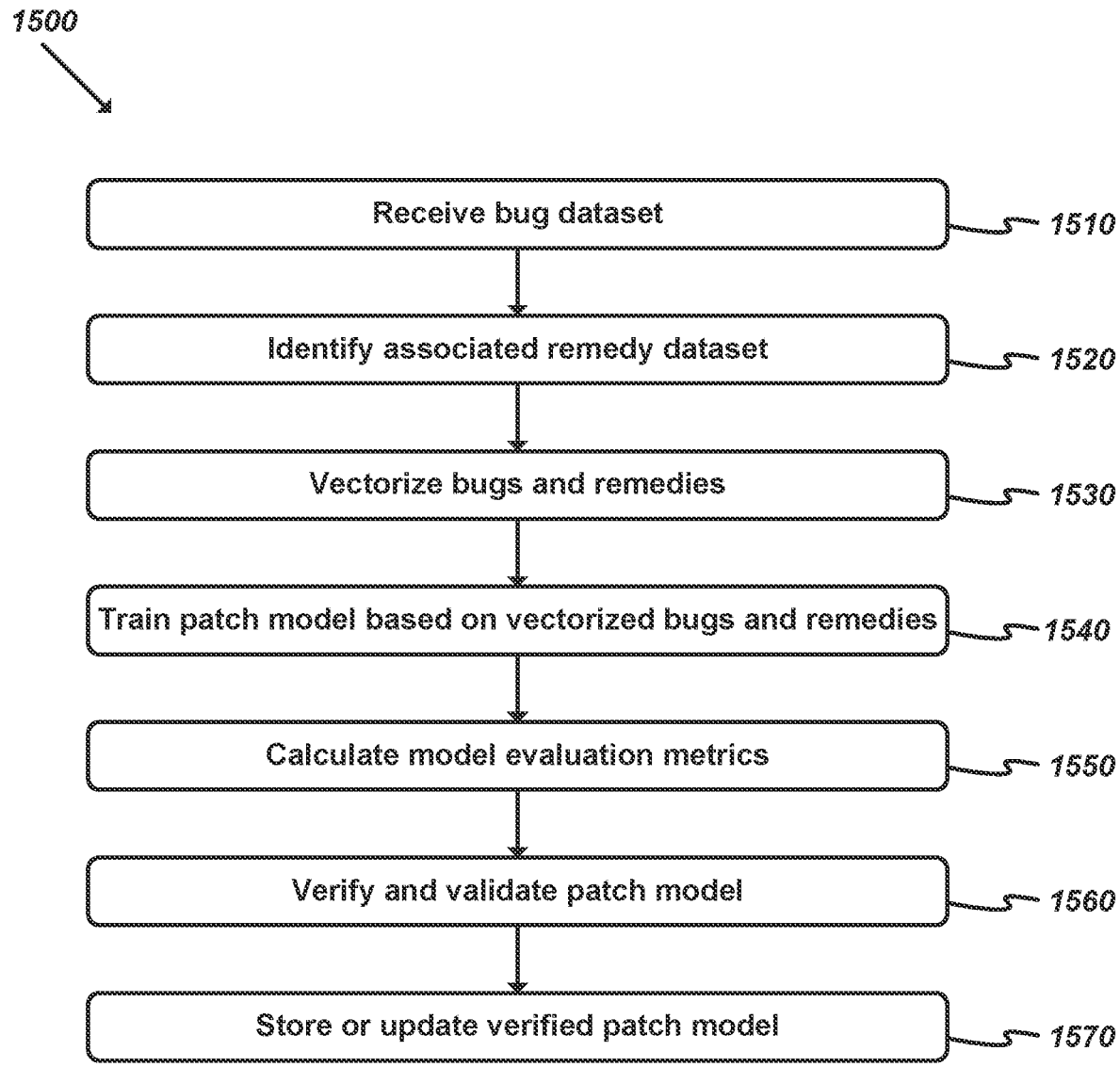
FIG. 15 illustrates a flow chart of an exemplary process for deep learning training according to one or more embodiments described herein.

FIG. 15 illustrates an example process 1500 for deep learning training. This example may utilize STS modeling or transformer modeling. The process may be performed to generate patch models, such as patch models 320, which may be used to automatically generate patches for bugs and/or vulnerabilities. STS modeling may use multiple RNNs to build or train patch models. Transformer modeling may use a multi-head attention encoder and decoder to build or train patch models. Deep learning models may translate code that includes bugs and/or vulnerabilities to remedied code. Process 1500 may be performed by graphical processing units (GPUs) and/or tensor processing units (TPUs), among other options. Once the models have been trained, the models may be used to quickly generate patches without needing to retrain or recalibrate the models. In some embodiments, process 1500 may be performed by patch model generator 300.

As shown, process 1500 may include receiving (at 1510) a bug dataset. The bug dataset may include a particular bug, type of bug, etc. The bug dataset may include bugs associated with a particular function or operator (e.g., "malloc"). The bug dataset may include associated bugs from multiple source code files.

Process 1500 may include identifying (at 1520) an associated remedy dataset. For each identified bug in the bug dataset, an associated remedy or revision may be identified (if the revision eliminated the bug). Each associated remedy may be included in the remedy dataset.

The process may include vectorizing (at 1530) the bugs and remedies. The bugs and remedies may be vectorized using processes such as processes 1200, 1300, and 1400. As discussed above, bugs may be vectorized into fixed-length vectors. Remedies may include variable numbers of vector elements.

As shown, process 1500 may include training (at 1540) a patch model based on the vectorized bugs and remedies. Such training may include deep learning training using RNNs or multi-head attention, for example. The model elements may be trained using the vectorized bugs as inputs and the vectorized remedies as associated outputs.

Model training may be limited to functions including no more than a specified number of tokens (e.g., four hundred tokens). The patch dataset may be randomly divided into a training dataset and a testing dataset. The training dataset may include, for example, eighty percent of the patch dataset elements, while the testing dataset may include twenty percent of the patch dataset elements.

Process 1500 may include calculating (at 1550) model evaluation metrics for the patch model. For example, model training may include calculation of loss (the difference between actual and predicted output). Models may be trained until the loss stops decreasing.

Evaluation of patch models may include comparison of model generated patches to implemented patches. However, some code may be logically the same but look different (e.g., "int *data=(int *)malloc(len * sizeof(int));" and "int *data= (int *)malloc(sizeof(int) * len);"). An accuracy score may include a lower bound that requires exact matching of elements (e.g., position and unique identifier) and an upper bound that matches all symbols regardless of order.

The process may include verifying and validating (at 1560) the patch model. Such verification and validation may include, for instance, comparing an accuracy score to a specified threshold. Verification and validation may include testing of output code generated by the patch model to verify that identified bugs were remedied and/or that no additional bugs were introduced.

Validity of the generated patch models may be tested by running source code associated with a known patch, or "ground truth patch," through patch generator 100 with a given patch model 320. Iterations of patch generation may be performed until patch generator 100 produces the known patch at a desired frequency. The more frequent the correct patch is produced, the more accurate the model is for producing a valid patch.

As shown, process 1500 may include storing or updating (at 1570) the verified patch model. Patch models that meet the verification criteria may be stored and/or otherwise made available for use (e.g., by adding the patch model to patch model database 750). Existing patch models may be evaluated and/or trained as additional data becomes available and/or if updated evaluation metrics exceed previously calculated evaluation metrics by a specified threshold.

In some embodiments, process 1500 may include MLM. MLM may be performed over a large dataset of functions to train a patch model to learn code structure. In MLM, a fraction of tokens in a function may be randomly selected and replaced. For instance, fifteen percent of the tokens may be randomly selected to be replace, and of those, eighty percent of the randomly selected tokens may be replaced with a "<MASK>" token, ten percent of the randomly selected tokens may be replaced with a random token, and the remaining ten percent of the randomly selected tokens may be left unchanged. The masked input with the modified tokens may then be input into the model, which may attempt to predict the original token. MLM trains the model to identify variables in code structure.

In some embodiments, process 1500 may include NSP modeling. NSP modeling provides two lines of code, with the model having to predict if the second line actually follows the first. In NSP modeling, an input function from a patch training dataset may be split in half, forming two logical code blocks. During fifty percent of the training runs, the second code block may be held constant. During the other fifty percent of the training runs, the second code block may be replaced with a random code block. The model may then be trained to predict if the second code block actually follows the first, or was randomly replaced. The above-described training models may be used, separately or in conjunction with each other, to generate patch models.

Figure 16:
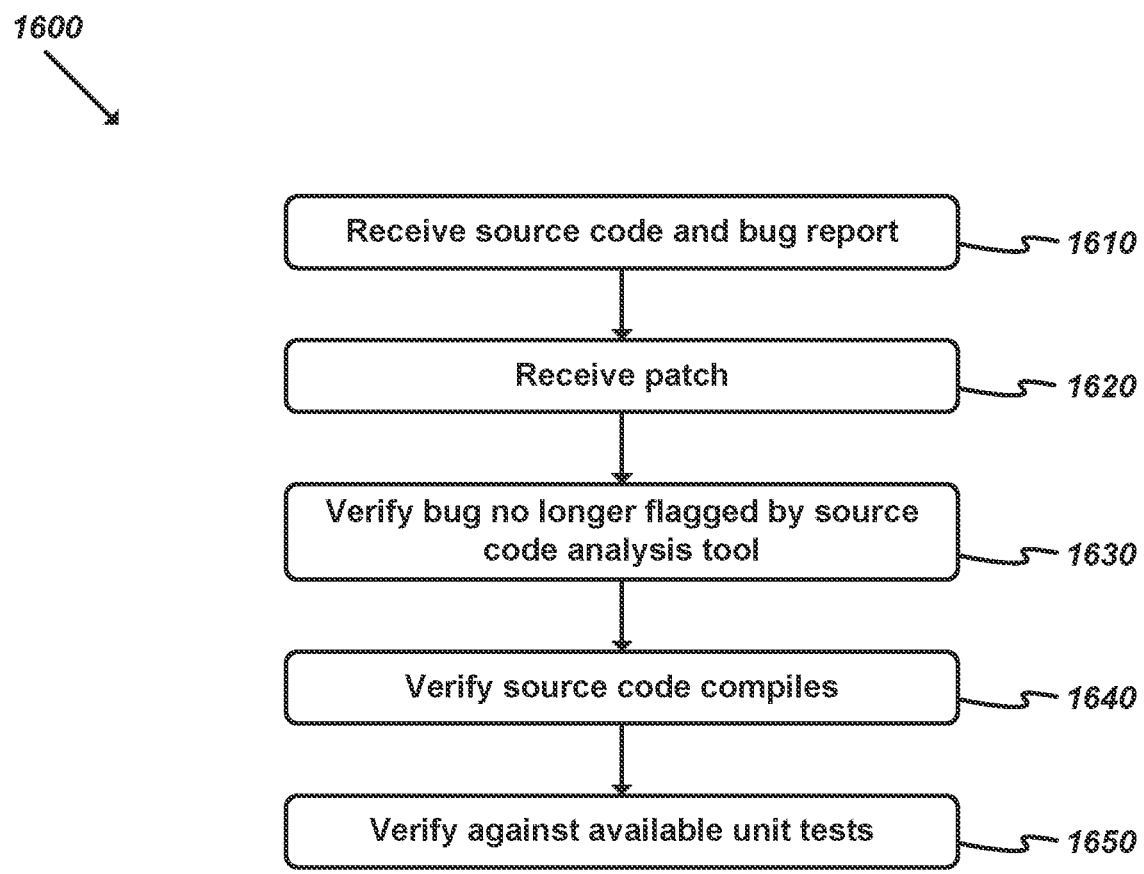
FIG. 16 illustrates a flow chart of an exemplary process for verifying a patch according to one or more embodiments described herein.

FIG. 16 illustrates a flow chart of an exemplary process 1600 for verifying a patch according to one or more embodiments described herein. Process 1600 may be performed at operation 1450 described above. Process 1600 may be implemented using commercial source analysis tools, such as Cppcheck, Fortify, and/or SonarQube, among other options. In some embodiments, process 1600 may performed by patch generator 100.

Process 1600 may include receiving (at 1610) the source code and bug report associated with the patch. The source code and bug report may be received from various appropriate resources, such as a server, storage, etc.

As shown, process 1600 may include receiving (at 1620) a patch. Such a patch may include a patch model, source code, patched output code, etc.

The process may include verifying (at 1630) that the bug is no longer flagged by the source code analysis tool. The patched source code may be run through a commercial source code analysis tool to check for the originally reported bug. If the originally reported bug is flagged by the source code analysis tool, the received patch may fail verification.

As shown, process 1600 may include verifying (at 1640) that the source code compiles. A compiler may be used to check if any new syntax errors are being reported in the patched or output code. If the source code does not compile correctly, the received patch may fail verification.

Process 1600 may include verifying (at 1650) against available unit tests. Unit test may be associated with units or components of software. Such unit tests allow each component to be independently validated. If the available unit tests are not passed, the received patch may fail verification.

Figure 17:
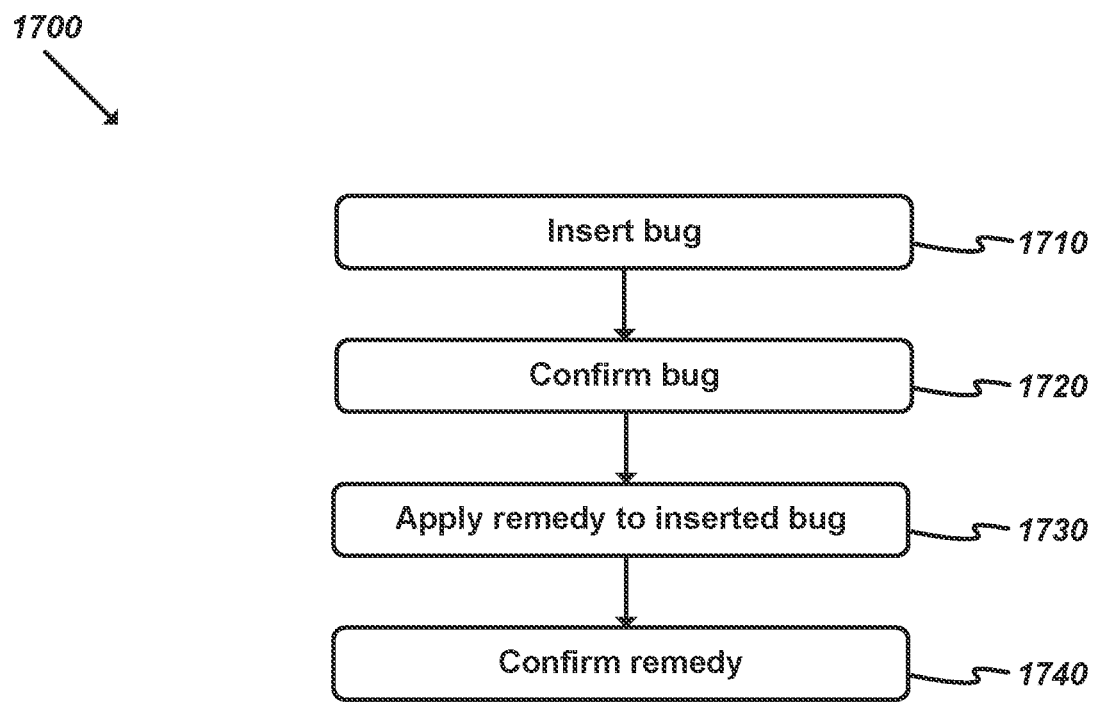
FIG. 17 illustrates a flow chart of an exemplary process for verifying a patch model according to one or more embodiments described herein.

FIG. 17 illustrates a flow chart of an exemplary process 1700 for verifying a patch model according to one or more embodiments described herein. Process 1700 may be performed at operation 1560. The process may be performed, for instance, when a new patch model is trained or updated. In some embodiments, process 1700 may be performed by patch model generator 300.

As shown, process 1700 may include inserting (at 1710) a bug into "clean" source code. The bug may be retrieved from a code example associated with the patch model. In some embodiments, the bug may be generated based on the fixed-length vector associated with the patch model.

Process 1700 may include confirming (at 1720) the bug. Such confirmation may include testing or otherwise evaluating the source code to determine whether the inserted bug is identified. Such testing may include various testing resources, test types, unit tests, etc.

The process may include applying (at 1730) the remedy generated by the patch model to the inserted bug. The remedy may be applied using a process such as process 1400.

As shown, process 1700 may include confirming (at 1730) the remedy. Such confirmation may include, for instance, matching the output code including the remedy to a ground truth patch. Confirmation may include testing the updated code to determine whether the inserted bug has been remedied. If the remedy is confirmed, the process may verify the patch model.

One of ordinary skill in the art will recognize that processes 1000, 1100, 1200, 1300, 1400, 1500, 1600 and 1700 may be implemented in various different ways without departing from the scope of the disclosure. For instance, the elements may be implemented in a different order than shown. As another example, some embodiments may include additional elements or omit various listed elements. Elements or sets of elements may be performed iteratively and/or based on satisfaction of some performance criteria. Non-dependent elements may be performed in parallel.

The processes and modules described above may be at least partially implemented as software processes that may be specified as one or more sets of instructions recorded on a non-transitory storage medium. These instructions may be executed by one or more computational element(s) (e.g., microprocessors, microcontrollers, digital signal processors (DSPs), application-specific integrated circuits (ASICs), field programmable gate arrays (FPGAs), other processors, etc.) that may be included in various appropriate devices in order to perform actions specified by the instructions.

As used herein, the terms "computer-readable medium" and "non-transitory storage medium" are entirely restricted to tangible, physical objects that store information in a form that is readable by electronic devices.

Figure 18:
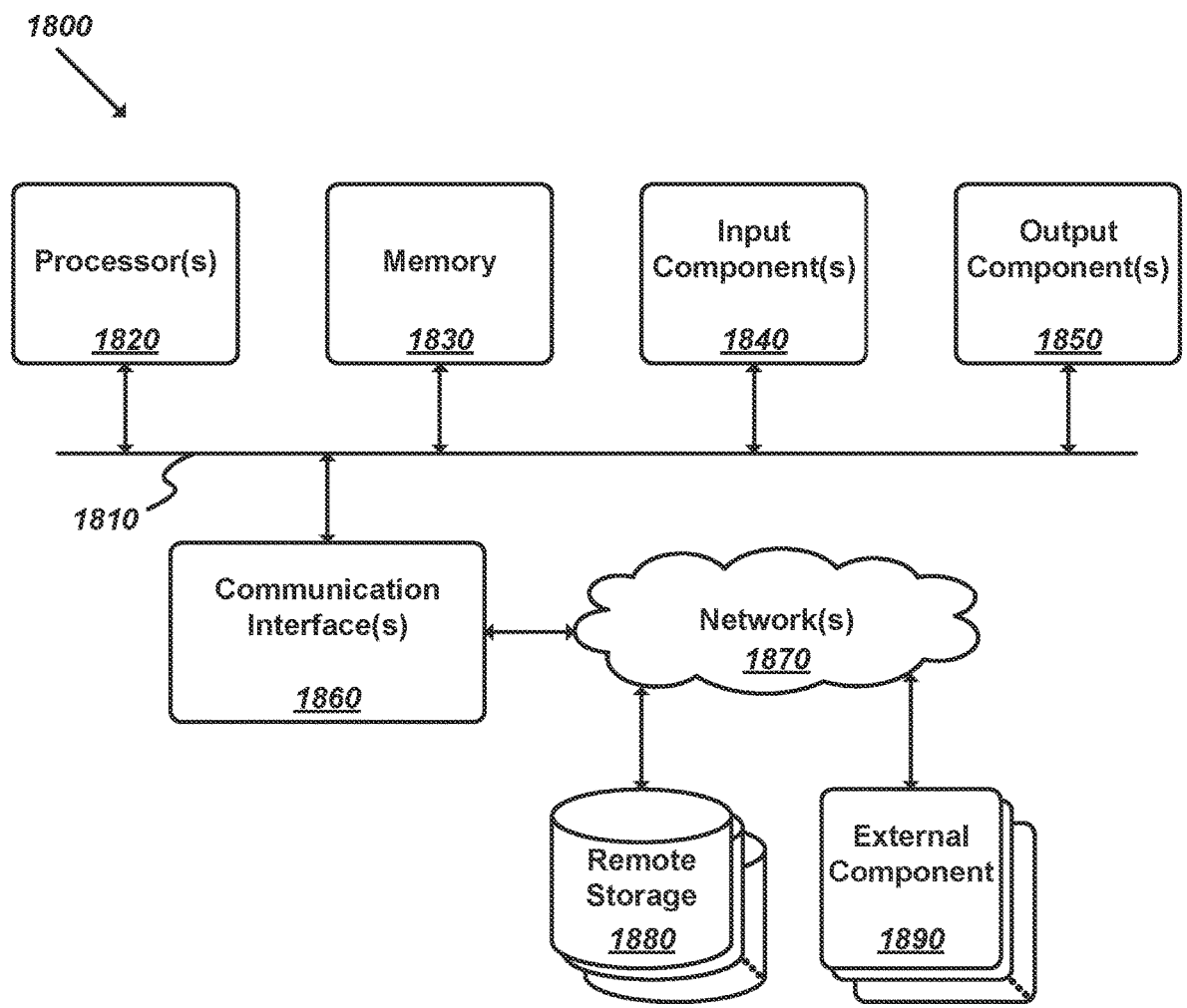
FIG. 18 illustrates a schematic block diagram of one or more exemplary devices used to implement various embodiments.

FIG. 18 illustrates a schematic block diagram of an exemplary device (or system or devices) 1800 used to implement some embodiments. For example, the systems and/or devices described above in reference to FIG. 1, FIG. 3, FIG. 7, FIG. 8, and/or FIG. 9 may be at least partially implemented using device 1800. As another example, the GUI described above in reference to FIG. 2 may be at least partially implemented using device 1800. As still another example, the processes described in reference to FIG. 10, FIG. 11, FIG. 12, FIG. 13, FIG. 14, FIG. 15, FIG. 16, and FIG. 17 may be at least partially implemented using device 1800.

Device 1800 may be implemented using various appropriate elements and/or sub-devices. For instance, device 1800 may be implemented using one or more personal computers (PCs), servers, mobile devices (e.g., smartphones), tablet devices, wearable devices, and/or any other appropriate devices. The various devices may work alone (e.g., device 1800 may be implemented as a single smartphone) or in conjunction (e.g., some components of the device 1800 may be provided by a mobile device while other components are provided by a server).

As shown, device 1800 may include at least one communication bus 1810, one or more processors 1820, memory 1830, input components 1840, output components 1850, and one or more communication interfaces 1860.

Bus 1810 may include various communication pathways that allow communication among the components of device 1800. Processor 1820 may include a processor, microprocessor, microcontroller, digital signal processor, logic circuitry, and/or other appropriate processing components that may be able to interpret and execute instructions and/or otherwise manipulate data. Memory 1830 may include dynamic and/or non-volatile memory structures and/or devices that may store data and/or instructions for use by other components of device 1800. Such a memory device 1830 may include space within a single physical memory device or spread across multiple physical memory devices.

Input components 1840 may include elements that allow a user to communicate information to the computer system and/or manipulate various operations of the system. The input components may include keyboards, cursor control devices, audio input devices and/or video input devices, touchscreens, motion sensors, etc. Output components 1850 may include displays, touchscreens, audio elements such as speakers, indicators such as light-emitting diodes (LEDs), printers, haptic or other sensory elements, etc. Some or all of the input and/or output components may be wirelessly or optically connected to the device 1800.

Device 1800 may include one or more communication interfaces 1860 that are able to connect to one or more networks 1870 or other communication pathways. For example, device 1800 may be coupled to a web server on the Internet such that a web browser executing on device 1800 may interact with the web server as a user interacts with an interface that operates in the web browser. Device 1800 may be able to access one or more remote storages 1880 and one or more external components 1890 through the communication interface 1860 and network 1870. The communication interface(s) 1860 may include one or more application programming interfaces (APIs) that may allow the device 1800 to access remote systems and/or storages and also may allow remote systems and/or storages to access device 1800 (or elements thereof).

It should be recognized by one of ordinary skill in the art that any or all of the components of computer system 1800 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

Device 1800 may perform various operations in response to processor 1820 executing software instructions stored in a computer-readable medium, such as memory 1830. Such operations may include manipulations of the output components 1850 (e.g., display of information, haptic feedback, audio outputs, etc.), communication interface 1860 (e.g., establishing a communication channel with another device or component, sending and/or receiving sets of messages, etc.), and/or other components of device 1800.

The software instructions may be read into memory 1830 from another computer-readable medium or from another device. The software instructions stored in memory 1830 may cause processor 1820 to perform processes described herein. Alternatively, hardwired circuitry and/or dedicated components (e.g., logic circuitry, ASICs, FPGAs, etc.) may be used in place of or in combination with software instructions to implement processes described herein. Thus, implementations described herein are not limited to any specific combination of hardware circuitry and software.

The actual software code or specialized control hardware used to implement an embodiment is not limiting of the embodiment. Thus, the operation and behavior of the embodiment has been described without reference to the specific software code, it being understood that software and control hardware may be implemented based on the description herein.

While certain connections or devices are shown, in practice additional, fewer, or different connections or devices may be used. Furthermore, while various devices and networks are shown separately, in practice the functionality of multiple devices may be provided by a single device or the functionality of one device may be provided by multiple devices. In addition, multiple instantiations of the illustrated networks may be included in a single network, or a particular network may include multiple networks. While some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items and may be used interchangeably with the phrase "one or more." Where only one item is intended, the terms "one," "single," "only," or similar language is used. Further, the phrase "based on" is intended to mean "based, at least in part, on" unless explicitly stated otherwise.

The foregoing relates to illustrative details of exemplary embodiments and modifications may be made without departing from the scope of the disclosure. Even though particular combinations of features are recited in the claims and/or disclosed in the specification, these combinations are not intended to limit the possible implementations of the disclosure. In fact, many of these features may be combined in ways not specifically recited in the claims and/or disclosed in the specification. For instance, although each dependent claim listed below may directly depend on only one other claim, the disclosure of the possible implementations includes each dependent claim in combination with every other claim in the claim set.

We claim:

1. A device, comprising:
one or more processors configured to:
receive source code comprising a section of source code associated with at least one bug or vulnerability;
generate a formatted code section based at least partly on the section of source code associated with at least one bug or vulnerability;
identify a matching patch model based on the formatted code section;
provide the formatted code section to the matching patch model;
receive a remedied code section from the matching patch model; and
apply the remedied code section to the section of source code associated with at least one bug or vulnerability,
wherein generating the formatted code section based at least partly on the section of source code associated with at least one bug or vulnerability comprises:
dividing the section of source code into sub-elements;
associating type information to the sub-elements to generate a plurality of tokens; and
mapping each token from the plurality of tokens to a unique identifier by applying transformer modeling via a multi-head attention encoder and an associated multi-head attention decoder,
wherein generating the formatted code section based at least partly on the section of source code associated with at least one bug or vulnerability further comprises:
generating a vector based on the unique identifiers.

2. The device of claim 1, wherein identifying a matching patch model based on the formatted code section comprises:
comparing the vector to a set of example vectors associated with a set of candidate patch models; and
calculating an accuracy score based on matching of unique identifiers between the vector and each example vector in the set of candidate patch models to select the candidate patch.

3. The device of claim 2, wherein the set of candidate patch models are generated by:
receiving a bug dataset associated with a particular bug;
identifying at least one associated remedy dataset;
vectorizing the bug dataset and the remedy dataset; and
training a patch model based on the vectorized bug dataset and vectorized remedy dataset.

4. The device of claim 1, wherein the remedied code section comprises a plurality of unique identifiers and applying the remedied code section comprises:
removing the section of source code associated with at least one bug or vulnerability;
converting each unique identifier from the plurality of unique identifiers to a source code sub-element; and
appending the source code sub-element to the section of source code.

5. The device of claim 1, wherein the one or more processors are further configured to analyze the remedied source code using a source code analysis tool to determine whether the at least one bug or vulnerability has been remedied.

6. A non-transitory computer-readable medium, storing a plurality of processor executable instructions to:
receive source code comprising a section of source code associated with at least one bug or vulnerability;

generate a formatted code section based at least partly on the section of source code associated with at least one bug or vulnerability;
identify a matching patch model based on the formatted code section;
provide the formatted code section to the matching patch model;
receive a remedied code section from the matching patch model; and
apply the remedied code section to the section of source code associated with at least one bug or vulnerability,
wherein generating the formatted code section based at least partly on the section of source code associated with at least one bug or vulnerability comprises:
dividing the section of source code into sub-elements;
associating type information to the sub-elements to generate a plurality of tokens; and
mapping each token from the plurality of tokens to a unique identifier by applying transformer modeling via a multi-head attention encoder and an associated multi-head attention decoder,
wherein generating the formatted code section based at least partly on the section of source code associated with at least one bug or vulnerability further comprises:
generating a vector based on the unique identifiers.

7. The non-transitory computer-readable medium of claim 6, wherein identifying a matching patch model based on the formatted code section comprises:
comparing the vector to a set of example vectors associated with a set of candidate patch models; and
calculating an accuracy score based on matching of unique identifiers between the vector and each example vector in the set of candidate patch models to select the candidate patch.

8. The non-transitory computer-readable medium of claim 7, wherein the set of candidate patch models are generated by:
receiving a bug dataset associated with a particular bug;
identifying at least one associated remedy dataset;
vectorizing the bug dataset and the remedy dataset; and
training a patch model based on the vectorized bug dataset and vectorized remedy dataset.

9. The non-transitory computer-readable medium of claim 6, wherein the remedied code section comprises a plurality of unique identifiers and applying the remedied code section comprises:
removing the section of source code associated with at least one bug or vulnerability;
converting each unique identifier from the plurality of unique identifiers to a source code sub-element; and
appending the source code sub-element to the section of source code.

10. The non-transitory computer-readable medium of claim 6, wherein the plurality of processor executable instructions are further to analyze the remedied source code using a source code analysis tool to determine whether the at least one bug or vulnerability has been remedied.

11. A method comprising:
receiving source code comprising a section of source code associated with at least one bug or vulnerability;
generating a formatted code section based at least partly on the section of source code associated with at least one bug or vulnerability;
identifying a matching patch model based on the formatted code section;
providing the formatted code section to the matching patch model;
receiving a remedied code section from the matching patch model; and
applying the remedied code section to the section of source code associated with at least one bug or vulnerability,
wherein generating the formatted code section based at least partly on the section of source code associated with at least one bug or vulnerability comprises:
dividing the section of source code into sub-elements;
associating type information to the sub-elements to generate a plurality of tokens; and
mapping each token from the plurality of tokens to a unique identifier by applying transformer modeling via a multi-head attention encoder and an associated multi-head attention decoder,
wherein generating the formatted code section based at least partly on the section of source code associated with at least one bug or vulnerability further comprises:
generating a vector based on the unique identifiers.

12. The method of claim 11, wherein identifying a matching patch model based on the formatted code section comprises:
comparing the vector to a set of example vectors associated with a set of candidate patch models; and
calculating an accuracy score based on matching of unique identifiers between the vector and each example vector in the set of candidate patch models to select the candidate patch.

13. The method of claim 12, wherein the set of candidate patch models are generated by:
receiving a bug dataset associated with a particular bug;
identifying at least one associated remedy dataset;
vectorizing the bug dataset and the remedy dataset; and
training a patch model based on the vectorized bug dataset and vectorized remedy dataset.

14. The method of claim 11, wherein the remedied code section comprises a plurality of unique identifiers and applying the remedied code section comprises:
removing the section of source code associated with at least one bug or vulnerability;
converting each unique identifier from the plurality of unique identifiers to a source code sub-element; and
appending the source code sub-element to the section of source code.

* * * * *